(12) United States Patent
Albayrak et al.

(10) Patent No.: US 10,774,223 B2
(45) Date of Patent: Sep. 15, 2020

(54) METHOD FOR PRODUCING ANISOTROPIC ZINC PHOSPHATE PARTICLES

(71) Applicant: Leibniz-Institut für Neue Materialien gemeinnützige GmbH, Saarbrücken (DE)

(72) Inventors: Sener Albayrak, Saarbrücken (DE); Carsten Becker-Willinger, Saarbrücken (DE); Dirk Bentz, Landau (DE); Emilie Marie Perre, Woustwiller (FR)

(73) Assignee: Leibniz-Institut für Neue Materialien gemeinnützige GmbH, Saarbrücken (DE)

( * ) Notice: Subject to any disclaimer, the term of this patent is extended or adjusted under 35 U.S.C. 154(b) by 0 days.

(21) Appl. No.: 15/535,739

(22) PCT Filed: Dec. 16, 2015

(86) PCT No.: PCT/EP2015/079960
§ 371 (c)(1),
(2) Date: Jun. 14, 2017

(87) PCT Pub. No.: WO2016/102265
PCT Pub. Date: Jun. 30, 2016

(65) Prior Publication Data
US 2017/0349764 A1 Dec. 7, 2017

(30) Foreign Application Priority Data

Dec. 22, 2014 (DE) .................. 10 2014 119 472

(51) Int. Cl.
*C09D 5/08* (2006.01)
*C01B 25/45* (2006.01)
(Continued)

(52) U.S. Cl.
CPC .............. *C09D 5/084* (2013.01); *C01B 25/37* (2013.01); *C01B 25/45* (2013.01); *C04B 22/16* (2013.01);
(Continued)

(58) Field of Classification Search
CPC ...... C09D 5/084; C09D 163/00; C09K 15/02; C01B 25/45; C01B 25/37; C04B 22/16;
(Continued)

(56) References Cited

U.S. PATENT DOCUMENTS 4,153,479 A  5/1979 Ayano et al.
5,030,285 A * 7/1991 Vallvey ................. C09C 1/0081
106/14.05

(Continued)

FOREIGN PATENT DOCUMENTS

DE    1815112 A1   7/1970
DE     154490 A1   7/1972
(Continued)

OTHER PUBLICATIONS

Thresiamma George Soft Chemical Synthesis and Characterization of Nano Phased Metal Ferrites, Vanadates, and Phosphates 213-238, 2010 (Year: 2010).*

(Continued)

*Primary Examiner* — Andrew J. Oyer
(74) *Attorney, Agent, or Firm* — Cahn & Samuels, LLP

(57) ABSTRACT

Anisotropic zinc phosphate particles and zinc metal mixed phosphate particles having an orthorhombic crystal structure and a platelet-shaped particle morphology are obtained from a composition comprising at least one phosphate compound; at least one zinc compound and at least one chelate complexing agent having at least two oxygen-containing groups and at least one solvent.

16 Claims, 20 Drawing Sheets

(51) Int. Cl.
*C04B 22/16* (2006.01)
*C09D 163/00* (2006.01)
*C09K 15/02* (2006.01)
*C01B 25/37* (2006.01)
*C08K 3/32* (2006.01)
*C04B 111/00* (2006.01)

(52) U.S. Cl.
CPC ............ *C09D 163/00* (2013.01); *C09K 15/02* (2013.01); *C04B 2111/00836* (2013.01); *C08K 3/32* (2013.01); *C08K 2003/328* (2013.01)

(58) Field of Classification Search
CPC .... C04B 2111/00836; C08K 2003/328; C08K 3/32
See application file for complete search history.

(56) References Cited

U.S. PATENT DOCUMENTS

| | | | |
|---|---|---|---|
| 5,137,567 | A | 8/1992 | Vallvey et al. |
| 5,653,790 | A | 8/1997 | Fotinos et al. |
| 2006/0113005 | A1 | 6/2006 | Ando et al. |
| 2011/0008645 | A1 | 1/2011 | Schneider et al. |

FOREIGN PATENT DOCUMENTS

| | | | | |
|---|---|---|---|---|
| DE | 2154490 | A1 | 7/1972 | |
| DE | 2842150 | A1 | 4/1980 | |
| DE | 3046697 | A1 | 7/1982 | |
| DE | 69706161 | T2 | 3/2002 | |
| EP | 0896641 | B1 | 8/2001 | |
| EP | 1988189 | A1 | 11/2008 | |
| GB | 866377 | A * | 4/1961 | ............. C23C 22/17 |
| GB | 1348136 | A | 3/1974 | |
| JP | H04310511 | A | 11/1992 | |
| JP | H05239376 | A | 9/1993 | |
| JP | H10036107 | A | 2/1998 | |
| JP | 2000154010 | A | 6/2000 | |

OTHER PUBLICATIONS

English Translation of JP2000154010 (Year: 2000).*
Lubkowski et al "Studies on Obtaining of Zinc Phosphate Nanomaterials" Rev. Adv. Mater. Sci. 14 (2007) 46-48 (Year: 2007).*
Grzmil et al., "Studies on Obtaining of Zinc Phosphate Nanomaterials", Rev.Adv.Mater.Sci. 14, (2007), 46-48.
Parhi et al., "Room Temperature Metathetic Synthesis and Characterization of α-Hopeite, $ZN_3(PO_4)_2 \cdot 4H_2O$", Materials Research Bulletin 43, (2008), 1836-1841.
Ma et al., "Simple Synthesis of Layered Zinc Phosphate and its Evaluation of the Corrosive Effectiveness", Applied Mechanics and Materials, 2012, vols. 236-237, 105-108.
English Abstract of JP 2000154010.
English Abstract of JP H05239376.
English Abstract of JP H10036107.
English Abstract of EP 0896641.
English Abstract of DE 2842150.
English Abstract of DE 3046697.
English Abstract of DE 69706161.
English Abstract of DE 1815112.
English Abstract of JP H04310511.
International Preliminary Report on Patentability dated Jul. 6, 2017.
Xie et al., "Shape-Controlled Synthesis of Zinc Phosphate Nanostructures by an Aqueous Solution Route at Room Temperature," Materials Letters, 2012, vol. 82, 26-28.

\* cited by examiner (Example 3)

(Example 2)
H₃PO₄ (85 wt%)
Zn/P 1.5, 23 °C (Example 3a)

CS/Zn 0/1

CS/Zn 1/1

(Example 2a)
H₃PO₄ (30 wt%)

(Example 1b)        (Example 2)
CS/Zn 0.66/1        CS/Zn 1/1
Zn/P 1.5, $H_3PO_4$ (85 wt%)

(Example 2a)
CS/Zn 0.66/1        CS/Zn 1/1
Zn/P 1.5, $H_3PO_4$ (30 wt%)

CS/Zn 0.5/1    CS/Zn 1/1
Zn/P 1, H₃PO₄ (85 wt%)

CS/Zn 0.5/1    CS/Zn 1/1
Zn/P 1, H₃PO₄ (30 wt%)

CS/Zn 0/1

CS/Zn 1/1

CS/Zn 0/1

CS/Zn 1/1

(Example 4)  (Example 5)
CS/Zn 0/1  CS/Zn 0.1/1

(Example 6)
CS/Zn 0.5/1  CS/Zn 0.8/1

1x centrifuged    2x centrifuged

Example 6: Zn/P 1, CS/Zn 0.8/1, 4x centrifuged

Na₂HPO₄ (10 wt%)

maleic acid malic acid citric acid ascorbic acid

Zn/P 1, CS/Zn 0.5/1
DEG/H$_2$O 0.25 (Example 9)

Zn/P 1, CS/Zn 0.5/1
DEG/H$_2$O 3.5 (Example 7)

Zn/P 1, CS/Zn 0.5/1
DEG/H$_2$O 16.9 (Example 8)

Zn/P 1.5

CS/Zn 0.5/1 in DEG (Mn/P = 1.5)

CS/Mn = 0/1 (Example 18)

(Mn/P = 1.5)
CS/Mn = 1/1 (Example 20)

METHOD FOR PRODUCING ANISOTROPIC ZINC PHOSPHATE PARTICLES

This patent application is a U.S. national stage application of PCT international application PCT/EP2015/079960 filed on 16 Dec. 2015 and claims priority of German patent document DE 10 2014 119 472.1 filed on 22 Dec. 2014, the entirety of which is incorporated herein by reference.

FIELD OF THE INVENTION

The invention relates to a method for producing anisotropic zinc phosphate particles and zinc metal mixed phosphate particles and their use.

Zinc phosphates in disperse phase are widely used in corrosion control, especially for low alloyed steels. Zinc metal mixed phosphates are firstly used in microscale form as pigmentary additives in coatings. They usually have a wide particle size distribution and are nonuniform in particle shape and their state of agglomeration. They are not, for example, dispersible in clearcoats whilst preserving optical transparency because the dimensions of the agglomerates present are in the micrometer range. In addition, dispersal in organic coatings is made difficult by the hydrophilicity of the zinc phosphate surface, necessitating a surface modification specific to the binder, in turn necessitating an additional processing step. Zinc metal mixed phosphates are secondly further used as aqueous dispersions to pretreat steel substrates of three-dimensional surface via dipcoating methods. These include the direct use of the phosphates as corrosion control primers via electroless methods of deposition and their use as an additive in electrocoatings. Zinc phosphates are further used as cements in dental engineering.

DE1815112 [Hoechst] describes a phosphate hardener in pigmented alkali metal silicate paints containing zinc phosphate, iron phosphate, lead phosphate, magnesium phosphate and mixtures thereof involving a subsequent heating process at 550-900° C. The compositions have a phosphorus oxide:iron oxide ratio of 1:1-3:1. Sintering together of primary particles is impossible to prevent at the stated temperatures, so the particles obtained are in a highly agglomerated state and are no longer fully redispersible. They are accordingly unsuitable for optical applications.

DE2842150 [Hoechst] lays claim to a method for producing finely divided zinc phosphates from zinc oxide and phosphoric acid in an equimolar ratio by agency of ultrasound (10-100 kHz, 1-50 kW/m$^3$) in water and subsequent spray drying. The last step involves the issue of particle agglomeration. The term "finely divided" is defined via a particle size<25 µm. No specific surface modification of the corpuscles is carried out.

DE3046697 A1 [Heubach] lays claims to metal oxide, phosphate, molybdate and chromate corrosion control pigments containing zinc, aluminum, iron, alkaline earth metal, chromium, lead or titanium as metal component, which are treated with phthalic acid and/or anhydride at 70-80° C. in aqueous solution. In a similar manner, DE3605526A1 [Heubach] encompasses corresponding corrosion control pigments and their use and DE3731737A1 [Heubach] encompasses those based on alkaline earth metal hydrogenphosphate, especially with magnesium and/or strontium. The particle varieties mentioned all have a wide particle size distribution with an average particle size in the micrometer range. The smaller fraction of the particles extends with its size distribution down into the submicrometer range. The particles are shapeless or ball shaped.

U.S. Pat. No. 5,030,285 [Colores Hispania] describes spherical zinc phosphate/iron phosphate particles as corrosion inhibiting pigment produced via a sulfate route at pH 7/80° C. in a particle size between 0.5 µm and 5 µm. The crystallinity of the zinc phosphate present is 10-70%. The amorphous fraction contains iron phosphate in a Zn:Fe molar ratio of from 1:0.001 to 1:0.3.

U.S. Pat. No. 5,137,567 [Colores Hispania] describes spherical zinc phosphate dihydrate and tetrahydrate as corrosion inhibiting pigment containing 0.5% to 6% of zinc oxide as secondary constituent. The synthesis proceeds from zinc oxide at pH 7 by admixture of ammonium chloride buffered phosphoric acid.

EP 0896641 B1/DE 69706161 T2 [PPG] lays claim to an aqueous acidic composition for forming a zinc phosphate and tungsten containing coating on a metal substrate containing zinc ion, phosphate ion and tungsten aside an accelerator selected from a group consisting of an oxime, of mixtures of an oxime with hydroxylamine sulfate and in addition optionally also fluoride, manganese, calcium and/or magnesium ions. The coating composition is by virtue of its execution preferentially suitable for protection of aluminum substrates.

U.S. Pat. No. 4,153,479 [Oxy Metal Industries] describes an aqueous acidic oxidant- and alkali metal-free zinc phosphate solution proceeding from phosphoric acid and zinc oxide, hydroxide or carbonate, containing tartaric acid or citric acid and also their salts and optionally nickel. All essential components are simultaneously mixed in one reaction vessel. At pH values between 3.5 and 4.7, the solution on wet chemical application produces a microcrystalline zinc phosphate coating on iron and steel.

Lubkowski et al. describe the production of zinc phosphate nanomaterials from zinc nitrate, diammonium phosphate and citric acid. The solution is concentrated at elevated temperature to form a gel which is then calcined. A two-step heating process with a final temperature of 300° C. in the calcining step gives zinc phosphate in the form of hopeite. The crystallite sizes of the particles formed are computed from the x-ray spectra as 40-130 nm. There are no electron micrographs to give pointers to the particle morphology.

Yuan et al. describe the production of platelet-shaped hopeite particles from zinc oxide and phosphoric acid at pH 6-8 and a temperature of 70° C. The particles are lamellar microcrystalline in construction and of orthorhombic and monoclinic crystal structure. They are shown by electron microscopy to have a block-shaped, granular morphology with an average particle size of 10 µm.

McCurdy et al. describe the metathesis synthesis of α-hopeite at room temperature by mortaring zinc chloride with various phosphorus compounds such as $Na_3PO_4$, $Na_2HPO_4$, $NaH_2PO_4$ and $K_2HPO_4$ and subsequent washing with water and then with acetone. The x-ray spectra after mortaring show initially the crystal structure of NaCl and after the washing process that of α-hopeite which forms spontaneously. Electron micrographs show platelet-shaped particles of high aspect ratio, in particular on the use of $Na_3PO_4$ as phosphorus compound.

The problem addressed by the present invention is that of providing from inexpensive starting compounds zinc phosphate and zinc metal mixed phosphate particles that are precisely anisotropicizable in their particle shape and, if necessary, fully dispersible down to primary particle size.

SUMMARY OF THE INVENTION

The problem is solved by the inventions having the features of the independent claims. Advantageous developments of the inventions are characterized in the dependent claims. The wording of all claims is hereby incorporated in this description by reference. The inventions also encompass all sensible and, more particularly, all mentioned combinations of dependent and/or independent claims.

The problem is solved by a method for producing anisotropic zinc phosphate particles or zinc metal mixed phosphate particles comprising the steps of:

a) producing a composition comprising at least one phosphate compound; at least one zinc compound and at least one chelate complexing agent having at least two oxygen-containing groups and at least one solvent,
b) forming anisotropic zinc phosphate particles or zinc metal mixed phosphate particles;
c) separating off the particles obtained.

Individual steps of the method will now be more particularly described. The steps need not necessarily be carried out in the stated order, and the method to be described may include further, unspecified steps.

As a result of producing a composition from the at least one zinc compound and at least one chelate complexing agent having at least two oxygen-containing groups, the $Zn^{2+}$ ions in this composition become complexed by the chelate complexing agent. Owing to the presence of the chelate complexing agent and the concentration-controlled rate of the nucleation and precipitation reaction, but few nuclei are formed, their continued growth being anisotropic and time delayed according to the concentration of the complexing agent. The combination of zinc phosphate precipitation kinetics, under deficiency concentration control, and synchronous complexation of $Zn^{2+}$ ions by means of a chelate complexing agent having at least two oxygen-containing groups leads, surprisingly, to thin, crystalline particles preferably having an orthorhombic crystal structure $(Zn_3(PO_4)_2*4H_2O)$ and a platelet-shaped morphology and also a high aspect ratio.

The step of separating off the particles may comprise for example the particles being isolated. This may be accomplished for example by filtration, centrifugation and/or sedimentation. The particles may also be washed in addition. However, the step of separating off may also comprise the suspension being further processed without the particles being isolated.

In one embodiment of the invention, the particles are isolated in a last step. This is to be understood as meaning the particles being separated off from the reaction solution. This may be accomplished for example by centrifugation and/or sedimentation. The particles may thereafter be redispersed or else dried.

The particles produced have a platelet-shaped particle morphology, preferably with an aspect ratio>2, more preferably >3. An aspect ratio is to be understood as meaning the ratio of length to thickness (L/D). Platelet-shaped particles have this ratio in two particle dimensions (L/D, B/D, FIG. 24). Here the aspect ratio is preferably based on the average length and thickness of a particle. The data can be determined using scanning electron microscopy. The dimensions of the particles are preferably determined by scanning electron micrographs of some adventitious portion capturing the measurements of 20 individual particles.

The particles preferably have an extent of at least 1 μm in at least one dimension, preferably an extent of at least 1 μm in at least two dimensions. This can be determined by analysis using scanning electron microscopy. The dimensions of the particles are preferably determined by scanning electron micrographs of some adventitious portion capturing the measurements of 20 individual particles.

In one embodiment, the particles have one dimension with an extent of at least 2 μm (measured by scanning electron microscopy) and one dimension with an extent of at least 1 μm. The dimensions of the particles are preferably determined by scanning electron micrographs of some adventitious portion capturing the measurements of 20 individual particles.

The maximum extent of the particles is preferably 100 μm, more preferably 50 μm. The dimensions of the particles are preferably determined by scanning electron micrographs of some adventitious portion capturing the measurements of 20 individual particles.

Preferably at least 30% (of the captured particles), preferably at least 60%, especially at least 70%, at least 80% of the particles, more preferably all captured individual particles fall within at least one of the above preferred embodiments of the invention with regard to aspect ratio and/or extent.

The at least one solvent is preferably selected from water and aliphatic or aromatic alcohols having at least one OH group. The aliphatic or aromatic alcohols in question are water miscible, which is to be understood as meaning the production of an at least 10 wt % solution in water. The composition preferably has but one liquid phase.

In a preferred embodiment of the invention, the at least one solvent is water and/or at least one aliphatic or aromatic alcohol, more preferably water and/or at least one aliphatic alcohol having at least one hydroxyl group.

Preferred aliphatic alcohols having at least one hydroxyl group are $C_1$-$C_8$ alcohols such as methanol, ethanol, 1-propanol, isopropanol, 1-butanol, 2-butanol, propylene glycol, glycerol, diols having 2 to 12 carbon atoms such as ethylene glycol, propylene glycol, butylene glycol, pentanediol, hexamethylene glycol, octanediol, neopentyl glycol, cyclohexanedimethanol, diethylene glycol, triethylene glycol, dipropylene glycol, or polyols having 2 to 12 carbon atoms, monoethers of diols, such as ethylene glycol or propylene glycol, with $C_1$-$C_6$ alcohols, such as isopropoxyethanol.

A mixture of water and at least one aforementioned alcohol may also be present. The mixture concerned preferably has one liquid phase, i.e., the water and the at least one alcohol are miscible with each other.

A preferred embodiment features water, features at least one of the aforementioned alcohols or features a mixture of water and at least one of the aforementioned alcohols. The ratio of water to alcohol is from 100:0 to 0:100, preferably from 100:0 to 60:40 (in wt %), more preferably from 100:0 to 70:30 (wt %), the meanings of 100:0 and of 0:100 being that respectively just water and just alcohol were used as solvent.

The choice of solvent is preferably such that at least the at least one zinc compound and the at least one chelate complexing agent are present therein as solute. It is from such a solution that the phosphate particles are then precipitatable.

The composition comprises at least one phosphate compound. It is preferably phosphoric acid and/or a salt of phosphoric acid which is concerned. Phosphate, dihydrogenphosphate and/or hydrogenphosphate may be concerned here. Preference is given to phosphoric acid and also to phosphate, dihydrogenphosphates and/or hydrogenphosphates of alkali metals or ammonium ions, preferably of ammonium, lithium, sodium and/or potassium. The phosphate compound is more preferably $Na_3PO_4$, $Na_2HPO_4$, $NaH_2PO_4$, $(NH_4)_3PO_4$, $(NH_4)_2HPO_4$, $(NH_4)H_2PO_4$ and/or $H_3PO_4$.

The concentration of the at least one phosphate compound in an aqueous composition is preferably above 0.5 wt % based on $PO_4^{3-}$. An aqueous composition here is a composition with a proportion of not less than 70 wt % based on the solvent. The phosphate content is preferably above 1 wt %, more preferably above 2 wt %. The phosphate content may independently be up to 40 wt %, preferably up to 30 wt %. A phosphate content between 0.5 wt % and 40 wt %, especially 2 wt % and 30 wt %, is particularly preferable. The phosphate content of nonaqueous compositions may be lower because of lower solubility.

A chelate complexing agent is a compound which by virtue of the at least two oxygen-containing groups is capable of constructing a complex in relation to a metal ion, preferably $Zn^{2+}$ ion. The at least two oxygen-containing groups are preferably selected from the group comprising carboxylic acid groups, carboxylic anhydride groups, ether groups, ester groups, keto groups and hydroxyl groups.

In a preferred embodiment of the invention, the chelate complexing agent is an organic acid having a pKa value<6. Preferably, the chelate complexing agent comprises at least one carboxylic acid group or vinylogous carboxylic acid group.

In a further preferred embodiment of the invention, the second oxygen-containing group is bonded to the first oxygen-containing group via not more than 10 bonds. The at least one chelate complexing agent may contain yet further oxygen-containing groups or other groups.

In a preferred embodiment of the invention, the at least one chelate complexing agent is selected from the group comprising α-hydroxycarboxylic acids, citric acid, malic acid, tartaric acid, ascorbic acid, mandelic acid, glyoxalic acid, malonic acid, lactic acid, acetic acid, fumaric acid, maleic acid, gluconic acid, phthalic acid and adipic acid. The chelate complexing agent may be present as free acid or else as anion.

The molar mass of the at least one chelate complexing agent is preferably below 500 g/mol, preferably below 300 g/mol.

Particularly preferred chelate complexing agents are citric acid, malic acid, tartaric acid, malonic acid, maleic acid, ascorbic acid and phthalic acid or salts thereof, which may be used singly or in combination.

The composition further comprises a zinc compound. The zinc compound preferably comprises a zinc salt, more preferably a zinc salt selected from the group comprising zinc nitrate, zinc nitrite, zinc chloride, zinc bromide, zinc iodide, zinc sulfate, and zinc salts of monomeric or polymeric organic acids, such as zinc acetate, zinc acetylacetonate, zinc benzoate, zinc formate, zinc lactate, zinc citrate, zinc tartrate, zinc ascorbate. The acid may also be the at least one chelate complexing agent. Mixtures of zinc compounds are also usable.

The ratio of chelate complexing agent (CS) and zinc compound is preferably at least 0.1/1, preferably at least 0.5/1 based on the molar ratios. In one embodiment of the invention, the ratio is in the range from 0.1/1 to 2.0/1, preferably in the range from 0.33/1 to 1.6/1 (CS/Zn ratio in mol based on $Zn^{2+}$), especially in the range from 0.5/1 to 1.5/1. When a further metal compound is additionally present, the molar fraction of this metal compound is added to the zinc compound fraction for the purpose of computing the ratio. The ratio CS/(Zn+metal compound) is then computed and has to meet the aforementioned conditions.

The composition may also contain yet at least one further metal compound when zinc metal phosphates are to be produced. This further metal compound is not a zinc compound. This is preferably accomplished by admixing corresponding salts of further metal compounds. Examples of further metal ions are manganese, magnesium, calcium, strontium, iron, cerium, aluminum, nickel or cobalt. These metal ions may be admixed as salts, for example as acetates, nitrates or chlorides.

The molar ratio between the at least one zinc compound and the at least one further metal compound is preferably in the range from 1/0 to 1/3 (based on the respective zinc and metal ions), preferably from 1/0 to 1/2, the meaning of 1/0 being that the composition does not comprise a further metal compound.

In a preferred embodiment of the invention, the molar ratio of the amount of the at least one zinc compound based on Zn ions and the admixed amount of the at least one phosphate compound based on P (Zn/P) is in the range from 0.8 to 1.8, preferably in the range from 1 to 1.7. When a further metal compound is additionally present, the molar fraction of this metal compound is added to the zinc compound fraction for the purpose of computing the ratio. The ratio (Zn+metal compound)/P is then computed and has to meet the aforementioned conditions.

In a preferred embodiment of the invention, the pH of the composition before starting the method is not more than 3.5, preferably not more than 3. This holds particularly for compositions where the proportion of solvent which is attributable to water is not less than 70 wt %.

In a preferred embodiment of the invention, the temperature of the composition in the step of forming the particles is less than 50° C., preferably less than 40° C., more preferably less than 30° C. This temperature may be between 5° C. and 50° C., preferably between 10° C. and 40° C., more preferably between 15° C. and 30° C. The low temperature promotes the formation of crystalline particles.

The composition may be commixed, e.g., stirred, to form the particles.

Precipitation process duration may be used to influence particle formation. It may be necessary to wait for not less than 30 minutes and preferably for not less than 1 hour before separating off the particles. Depending on the conditions, particle formation may take from 1 to 72 hours, preferably not less than 10 hours, especially not less than 15 hours, more preferably not less than 20 hours. It may be necessary to commix, e.g., stir, the composition in the process.

The concentration of zinc compound in an aqueous composition is preferably above 0.5 wt % based on $Zn^{2+}$.

An aqueous composition here is a composition with a proportion of not less than 70 wt % based on the solvent. The Zn content is preferably above 1 wt %, more preferably above 2 wt %. The Zn content may independently be up to 40 wt %, preferably up to 30 wt %. A Zn content between 0.5 wt % and 40 wt %, especially 2 wt % and 30 wt %, is particularly preferable.

The method may yet further include the step of adjusting the solids content of the composition to a certain value, for example in the range from 0.5 to 20 wt %, before or during the step of forming the particles. This step of adjusting may be accomplished for example by admixture of solvent. It is preferably at least one solvent which is admixed, more preferably water.

The particles obtained may optionally be washed in a subsequent step. This may be accomplished for example by single or multiple centrifugation, removal of the supernatant and admixture of water.

Not only particles having an orthorhombic crystal structure but also a series of further, secondary products (inter alia residues of the zinc compound, of the phosphate compound, soluble zinc carboxylate complexes, etc.) are obtained from the synthesis under the stated conditions. The subsequent centrifugation and washing process removes the water-soluble secondary constituents from the water-insoluble particles preferably having an orthorhombic crystal structure. The removal of the water-soluble secondary constituents, as the results of elemental analysis show, is virtually completely successful after just the first centrifugation step. The aspect ratio of the anisotropic particles here depends on the chelate complexing agent/Zn ratio. The centrifugation and washing process leaves the once established anisotropic particle shape and the aspect ratio of the anisotropic particles unchanged (see also FIG. 16).

The particles may thereafter be dried, preferably at temperatures below 150° C., preferably below 100° C., yet more preferably below 50° C., especially below 40° C. or below 35° C. Vacuum may also be applied in the process.

Calcination preferably does not take place.

The method of the invention enables the production of the particles using inexpensive starting materials and under simple conditions.

In a further embodiment of the invention, the composition of the invention is free from accelerators, such as nitriles, chlorates, bromates. These are used in particular in compositions for creation of phosphate layers on surfaces.

The composition of the invention is not applied on any surface. The particles form in the composition itself.

In one embodiment of the invention, the composition is obtained from two or more compositions. To this end, a composition comprising at least one phosphate compound and a further composition comprising at least one zinc compound and at least one chelate complexing agent having at least two oxygen-containing groups are produced. Thereafter the composition comprising the at least one phosphate compound is admixed to the composition comprising the at least one zinc compound and at least one chelate complexing agent. The composition of the invention forms in the process.

Admixture may be effected all at once or dropwise. In a further embodiment of the invention, the temperature at admixture is below 50° C., preferably 10° C. to 40° C., for all compositions involved in the method.

The composition comprising at least one phosphate compound is preferably a solution of the at least one phosphate compound. It is preferably phosphoric acid and/or an alkali salt of phosphoric acid which is concerned. Phosphate, dihydrogenphosphate and/or hydrogenphosphate may be concerned here. Preference is given to phosphoric acid and also to phosphate, dihydrogenphosphates and/or hydrogenphosphates of lithium, sodium and/or potassium. The phosphate compound is more preferably $Na_3PO_4$, $Na_2HPO_4$, $NaH_2PO_4$ and/or $H_3PO_4$.

The concentration of the at least one phosphate compound in this composition based on $PO_4^{3-}$ is preferably between 0.5 and 90 wt %. The concentration in an aqueous composition is preferably between 1 wt % and 90 wt %.

The concentration of the at least one zinc compound based on $Zn^{2+}$ in the other composition is preferably between 0.5 wt % and 30 wt %, preferably between 1 wt % and 25 wt % or between 1 wt % and 15 wt %.

When yet other metal compounds are added, these are dissolved in the composition comprising the at least one zinc compound. Their proportions based on the respective metal ions count as part of the proportions of the zinc compound.

The molar ratios between Zn and the chelate complexing agent correspond to the ratios in the composition of the invention.

The produced zinc phosphate particles and zinc metal mixed phosphate particles are useful for all customary applications of zinc phosphates or zinc metal mixed phosphates. They are for example useful as corrosion control pigments, for example in coatings and paints.

The particles of the invention are fully redispersible and therefore especially useful in coatings and paints.

Anisotropic, i.e., platelet-shaped, particles are capable in coating compositions especially of parallel alignment with the coated surface. Such coatings are as a result capable of offering a high barrier to diffusion. This is not possible with ball-shaped particles from the prior art. The coatings created on the surface require a treatment of the surface and frequently are suitable for certain surfaces only. Namely, they frequently have to be heated in order to form the phosphate layer or contain aggressive ingredients (oxidants, acids, etc.).

The particles of the invention may also be imported into a composite material comprising a polymer. They are importable for production of polymer composites especially into all common polymers produced by polycondensation, polyaddition, free-radical polymerization, ionic polymerization and copolymerization. Examples of such polymers are polyurethanes, polycarbonate, polyamide, polyacrylates, polyacrylic acid, polymethyl methacrylate (PMMA), polyester, polyolefins, rubber, polysiloxanes, ethylene-vinyl alcohol copolymer (EVOH), polylactides, polystyrene, polyethylene oxide (PEO), polyphenylene oxide (PPO), polyacrylonitrile (PAN), polyepoxies, polyamideimides, polyimides, epoxy-phenolic resins, epoxy-phenoxy resins.

The step of importing into polymers may be effected using common techniques such as, for example, extrusion, kneading processes, rotor-stator processes (Dispermat, Ultra-Turrax, etc.), grinding processes (ball milling etc.) or jet dispersal, and depends on the viscosity of the polymers.

Further details and features will become apparent from the below description of preferred exemplary embodiments in conjunction with the dependent claims. Here the particular features may be actualized on their own or two or more at a time in combination with one another. The ways to solve the addressed problem are not confined to the exemplary embodiments.

Range recitations for instance at all times encompass all—unspecified—intermediate values and all conceivable subintervals.

The figures show results and measurements regarding the exemplary embodiments. The ratios recited in the figure descriptions are all molar ratios. Specifically

DETAILED DESCRIPTION OF THE INVENTION

Table 1 shows the elemental analysis (CHNS) of Example 2 (Zn acetate and $H_3PO_4$ as starting compounds; Zn/P 1.5, CS/Zn 1/1, $H_3PO_4$ (85 wt %).

Table 2 shows the elemental analysis (CHNS) of Example 6 (Zn nitrate and $Na_2HPO_4$ as starting compounds; Zn/P 1, CS/Zn 0.8/1, $Na_2HPO_4$ (10 wt %).

Figure 24:
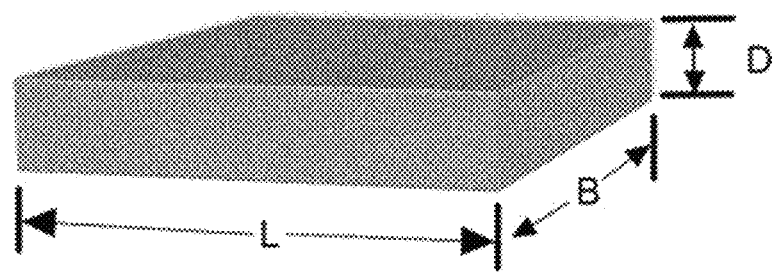
FIG. 24 shows schematic depiction of dimensions for platelet-shaped particle.

Table 3 shows dimensions and aspect ratios (AR) for invention zinc phosphate particles produced in the presence of different chelate complexing agents (CS). The dimensions of the particles were determined by scanning electron microscopy. The images were produced using the signal of the secondary electrons (acceleration voltage 10 kV, pressure 100 Pa). The micrographs shown depict a relief contrast. To determine the aspect ratios of individual particles, the length of the longer longitudinal axis (L) was divided in each case by the respective thickness (D) (FIG. 24). The average aspect ratios and the related standard deviations were determined from 20 aspect ratios of individual particles. The maximum aspect ratio reported is the largest aspect ratio found in the course of determining the aspect ratio of an individual particle.

The figures show some special advantages of the method according to the invention.

Figure 1:
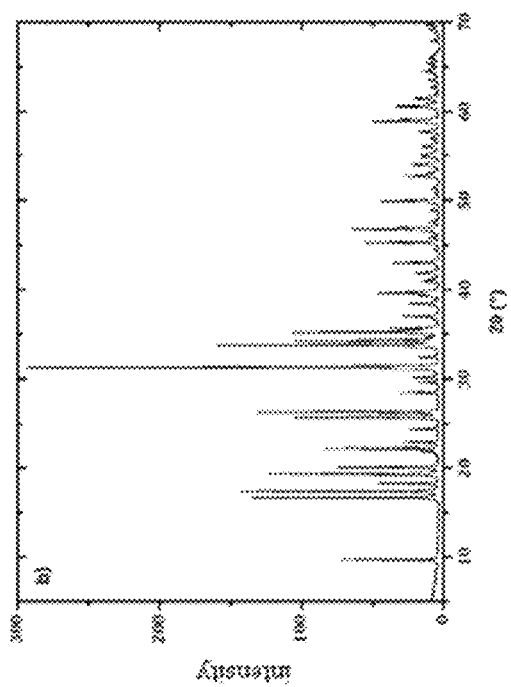
FIG. 1 shows a): diffractogram of Comparative Example 3: Zn/P=1.5 without citric acid as chelate complexing agent (CS) CS/Zn 0/1, $H_3PO_4$ (85 wt %), centrifuged 4×, diffractogram b): Example 2: Zn/P=1.5 with citric acid as chelate complexing agent (CS) CS/Zn 1/1, $H_3PO_4$ (85 wt %), centrifuged 4× (XRD spectrum of hopeite $Zn_3(PO_4)_2 \cdot 4H_2O$)
Figure 1:
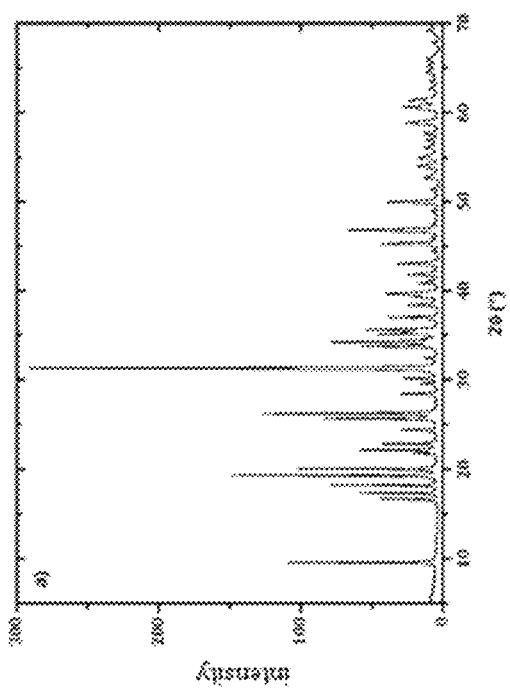
Figure 2:
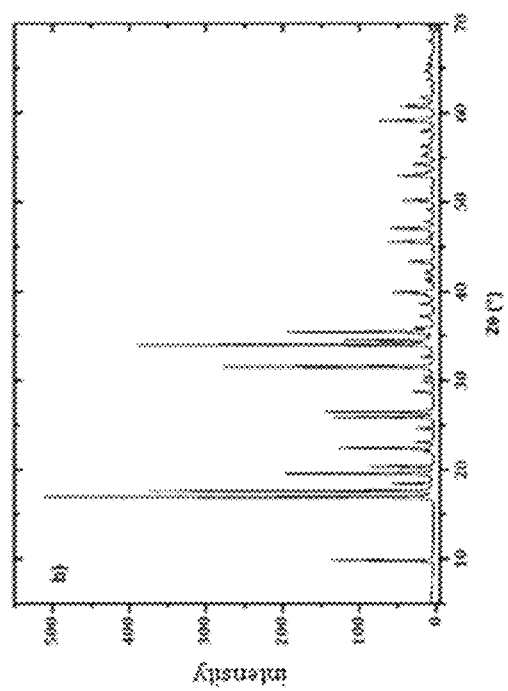
FIG. 2 shows dependence on centrifugation conditions, diffractograms a) Example 2: Zn/P=1.5; CS/Zn 1/1, $H_3PO_4$ (85 wt %), centrifuged 1×, diffractogram; b) Example 2: Zn/P=1.5, CS/Zn 1/1, $H_3PO_4$ (85 wt %), centrifuged 2×, (XRD spectrum of hopeite $Zn_3(PO_4)_2 \cdot 4H_2O$)
Figure 2:
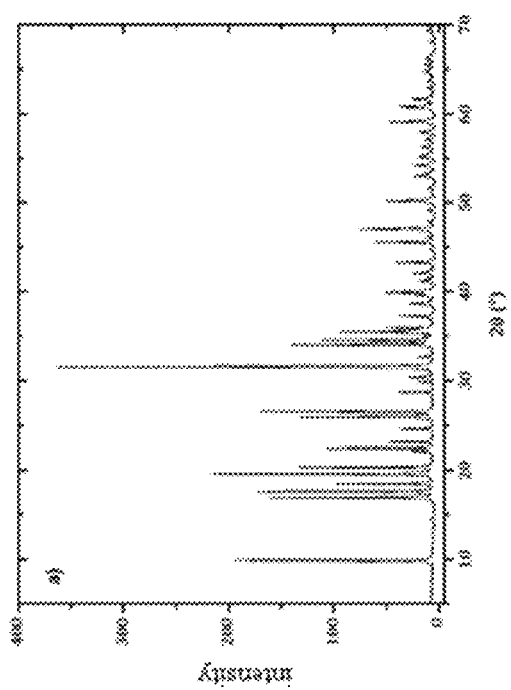
Figure 3:
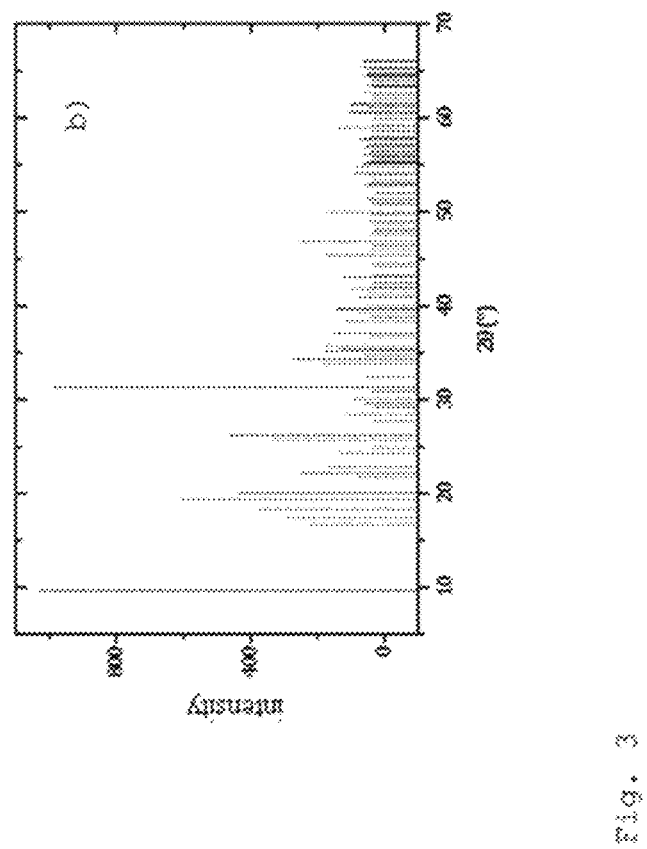
FIG. 3 shows a) diffractogram of Example 2a: CS/Zn 1/1, $H_3PO_4$ (30 wt %), centrifuged 4×; particle size: large: 2-3 µm; small 0.2-0.4 µm (XRD spectrum of hopeite $Zn_3(PO_4)_2*4H_2O$); b) comparative diffractogram for hopeite.
Figure 3:
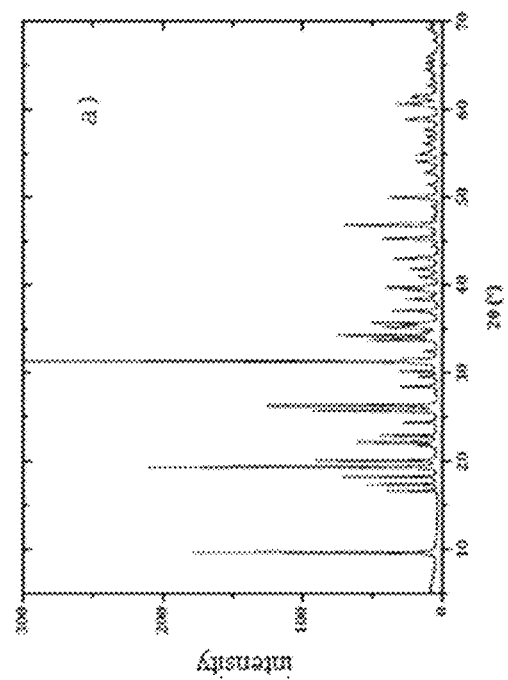
Figure 4:
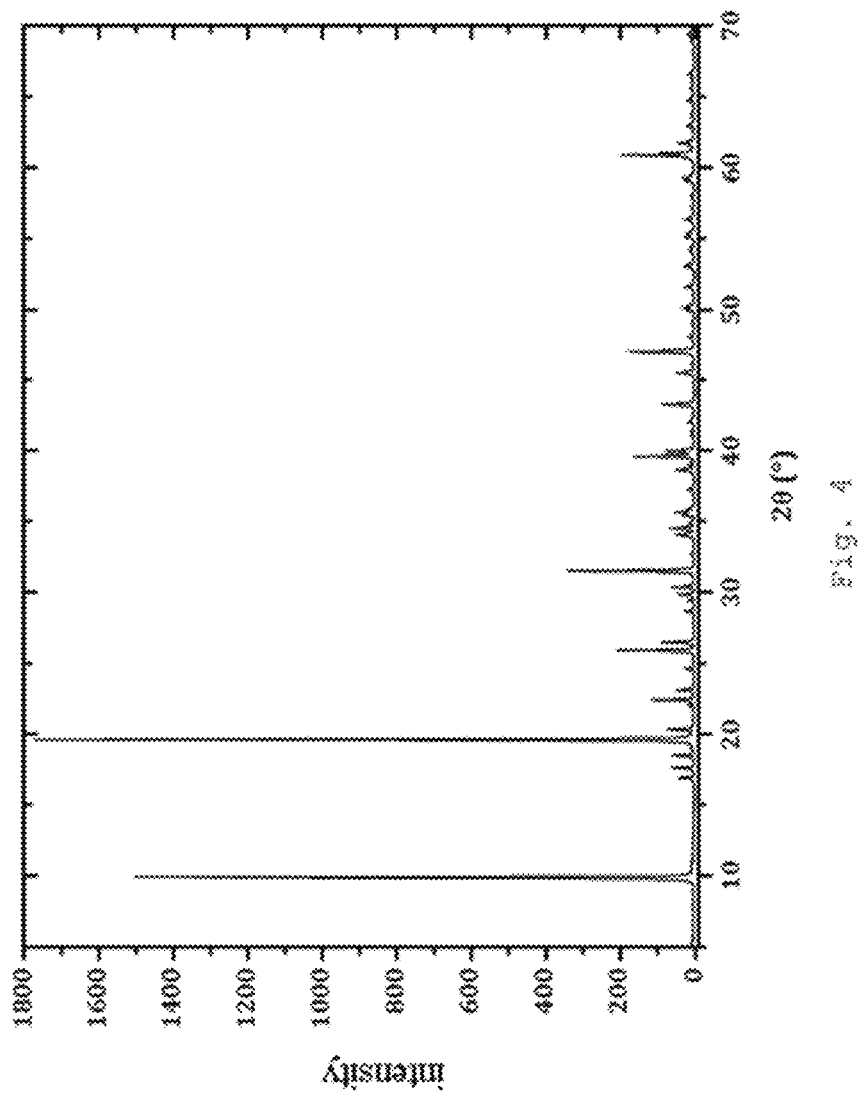
FIG. 4 shows diffractogram of Example 4: Zn/P=1, CS/Zn=0/1, centrifuged 4×.
Figure 5:
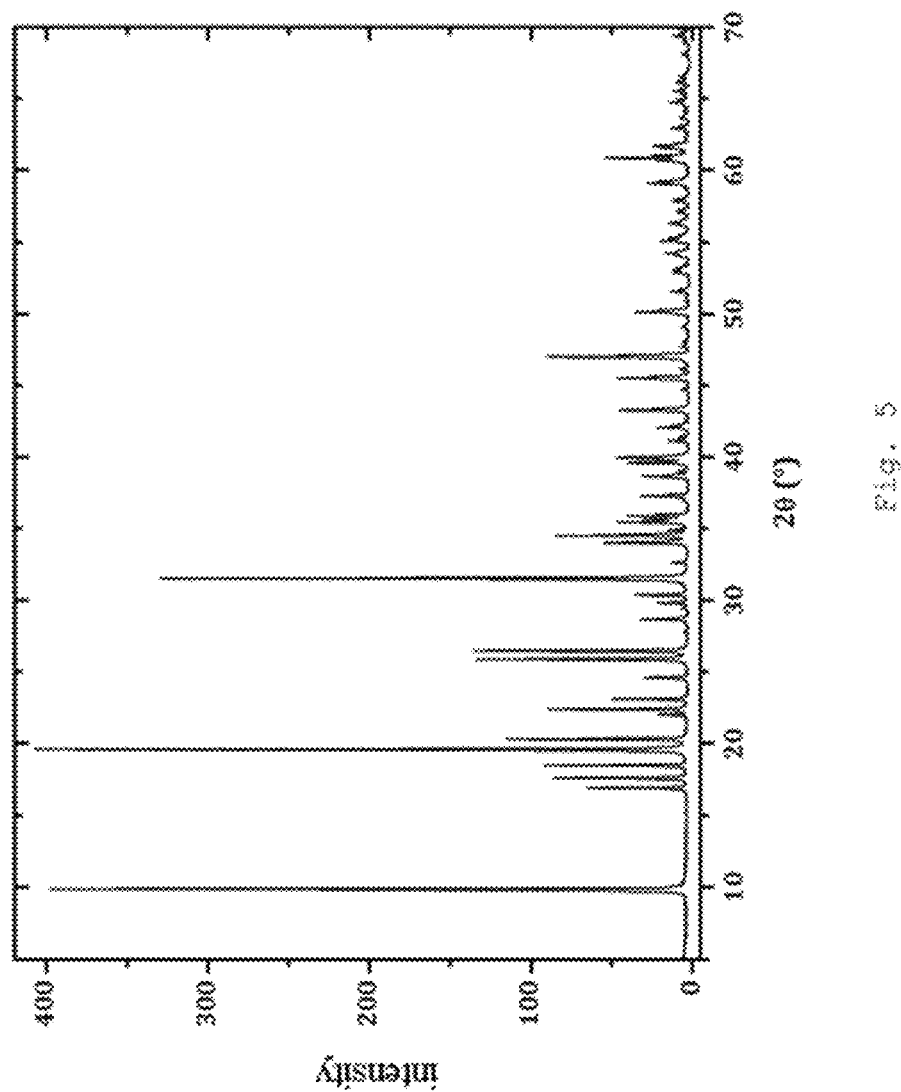
FIG. 5 shows diffractogram of Example 5: Zn/P=1, CS/Zn=0.1/1, centrifuged 4×.
Figure 6:
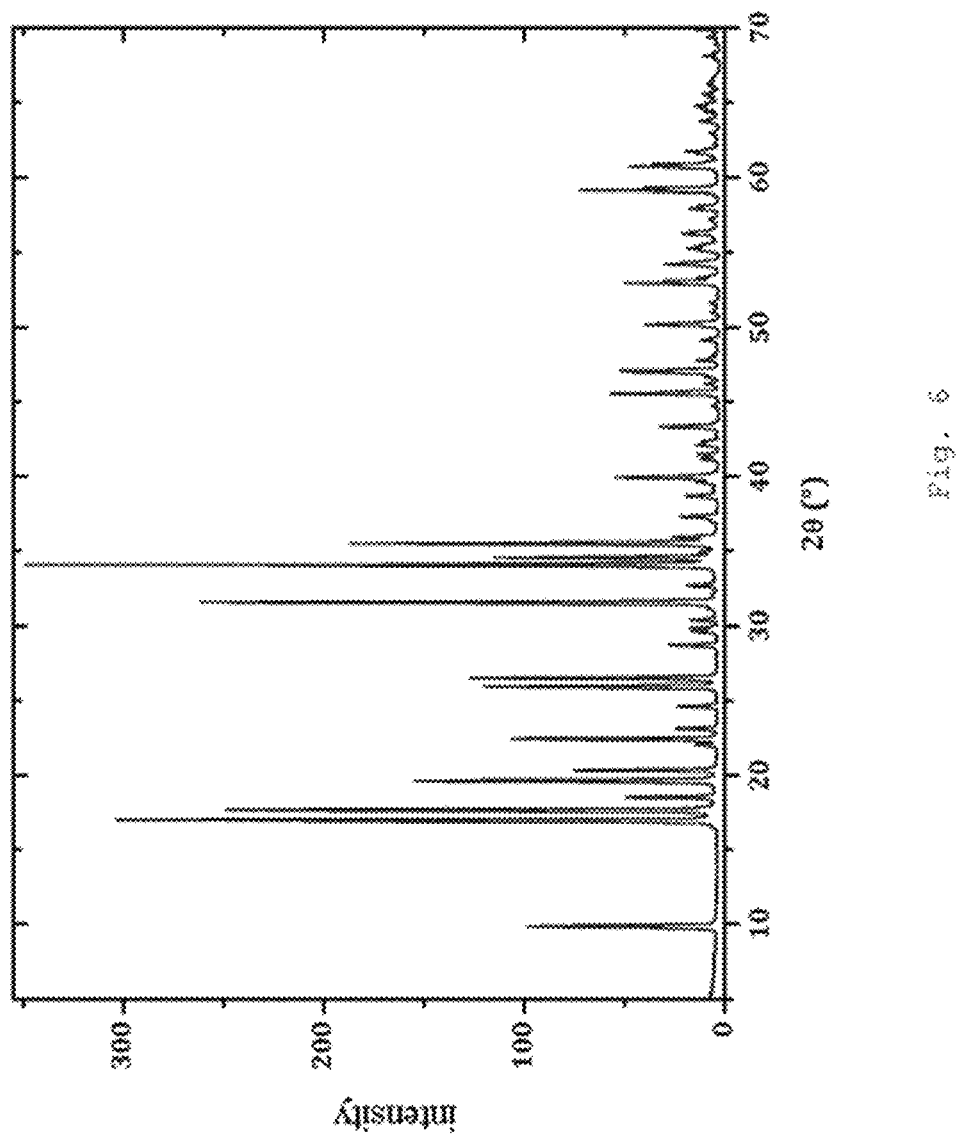
FIG. 6 shows diffractogram of Example 6: Zn/P=1, CS/Zn=0.8/1, centrifuged 1×.
Figure 7:
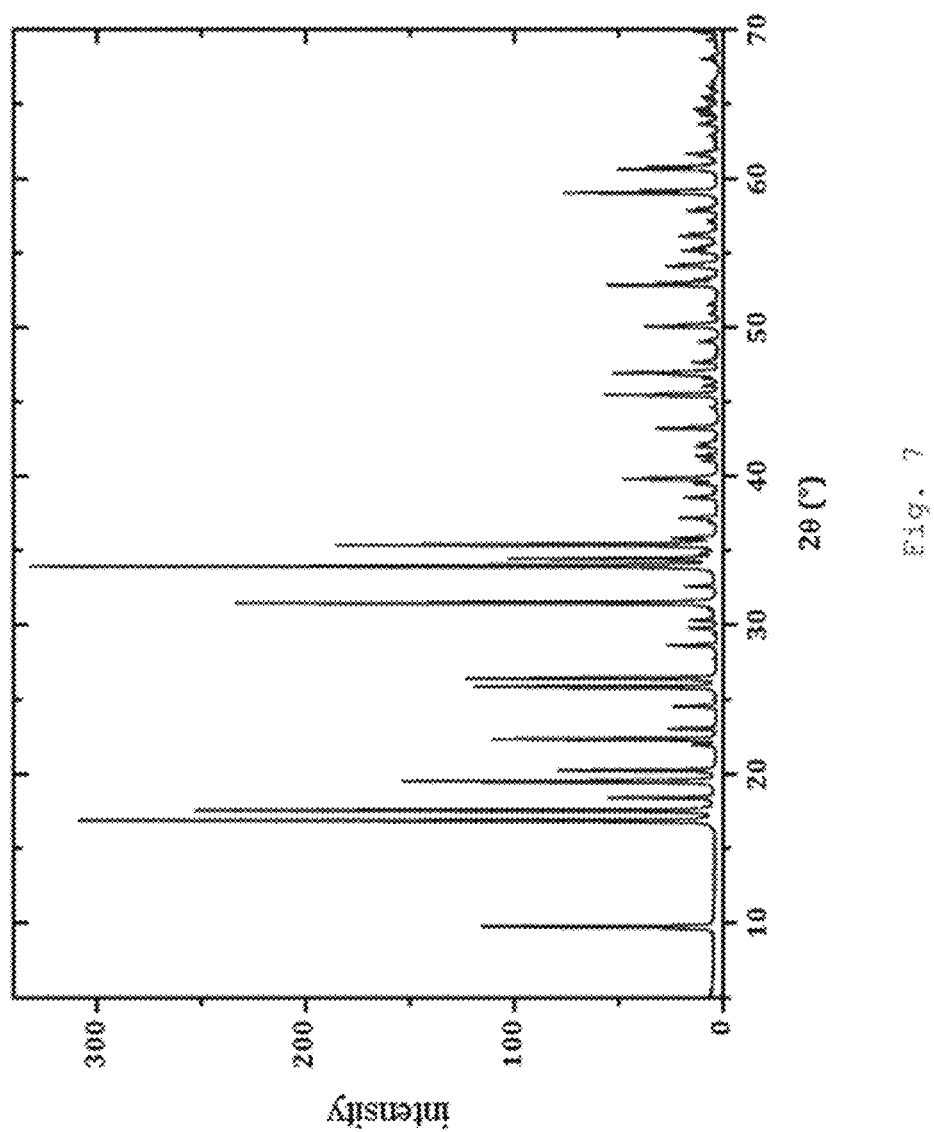
FIG. 7 shows diffractogram of Example 6: Zn/P=1, CS/Zn=0.8/1, centrifuged 2×.
Figure 8:
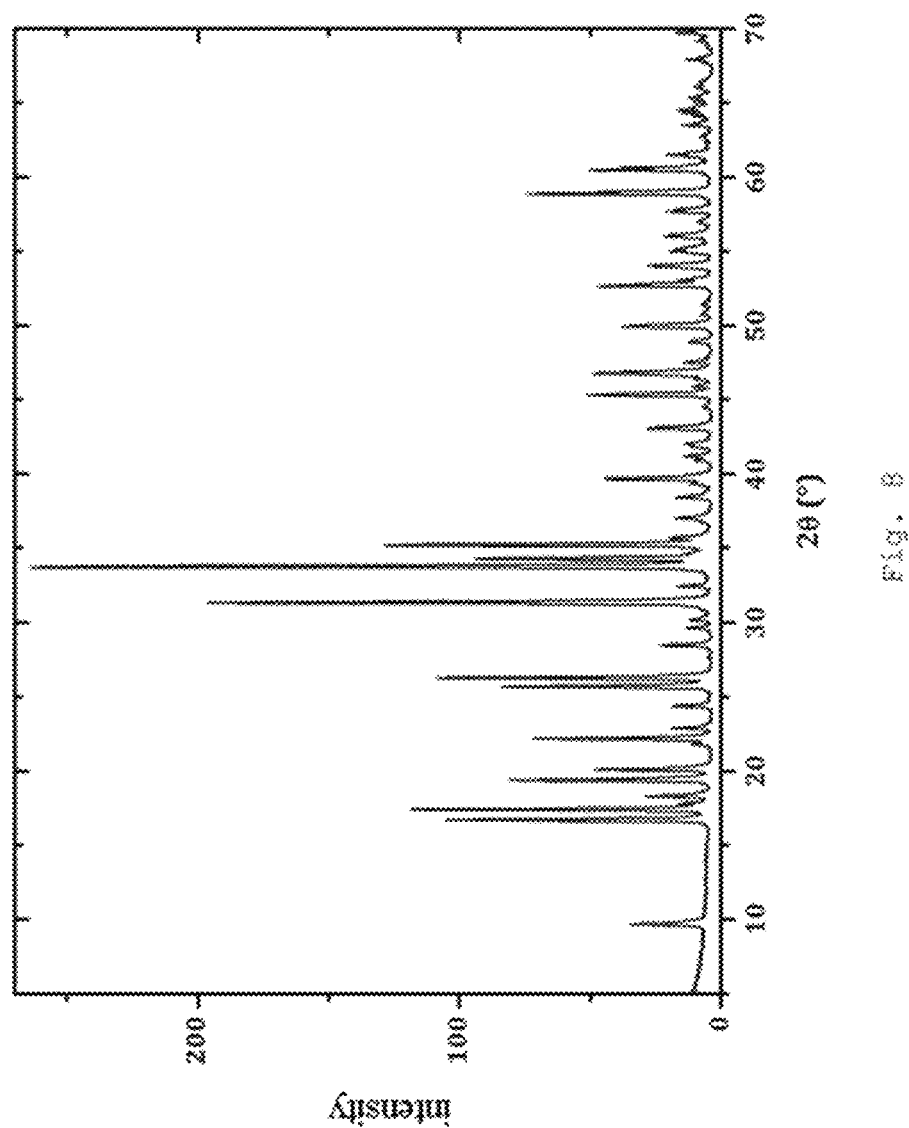
FIG. 8 shows diffractogram of Example 6: Zn/P=1, CS/Zn=0.8/1, centrifuged 4×.
Figure 9:
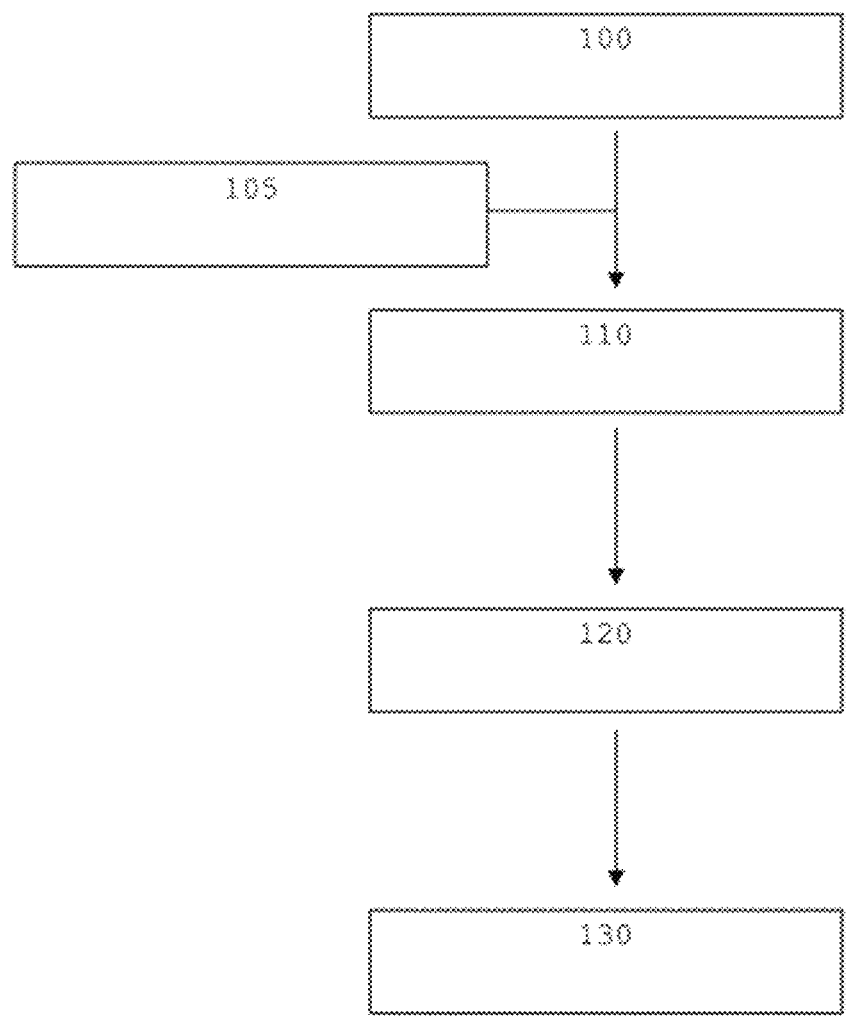
FIG. 9 shows schematic depiction of invention method.

FIG. 9 depicts an embodiment of the method according to the invention. The first step is that of preparing a composition comprising at least one zinc compound and at least one chelate complexing agent (100). There is also shown a composition comprising at least one phosphate compound (105). In a subsequent step (110) composition (105) is added to composition (100). In the process, the first nuclei are formed for the particles of the invention. It may optionally be necessary for crystallization for the composition to be stirred and/or left to stand for 1 hour to 72 hours (120), preferably not less than 20 hours. Thereafter the particles are separated off, optionally isolated (130). This may be effected by sedimentation and/or centrifugation, which may also be carried out multiple times, for example from 1 time to 5 times. The particles obtained may also be dried.

Figure 10:
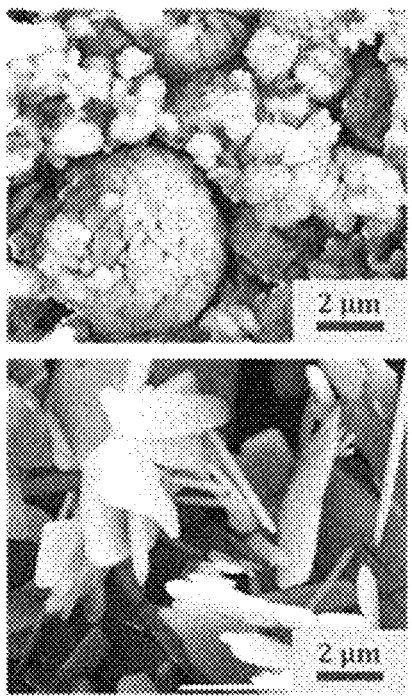
FIG. 10 shows scanning electron micrographs of obtained particles in Examples 3, 3a, 2 and 2a; influence without chelate complexing agent (shapeless particles) and with chelate complexing agent (platelet-shaped particles)
Figure 10:
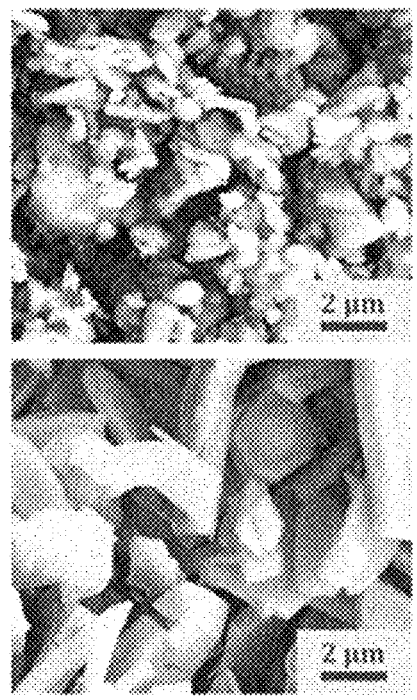
Figure 11:
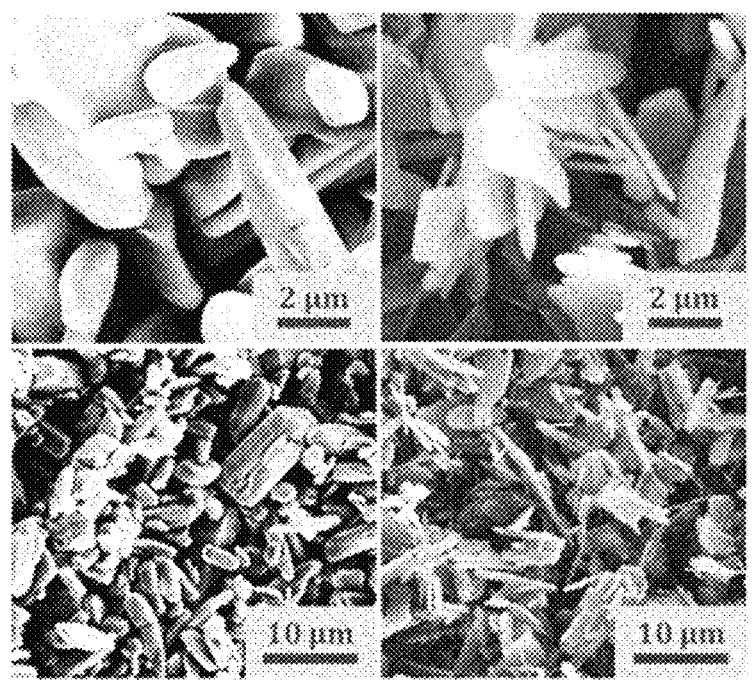
FIG. 11 shows scanning electron micrographs of obtained particles with the ratio Zn/P 1.5 and also CS/Zn 0.66/1 and 1/1 in various resolutions with differently concentrated phosphoric acid $H_3PO_4$ each time (top: 85 wt % Examples 1b and 2; bottom: 30 wt % Example 2a)
Figure 11:
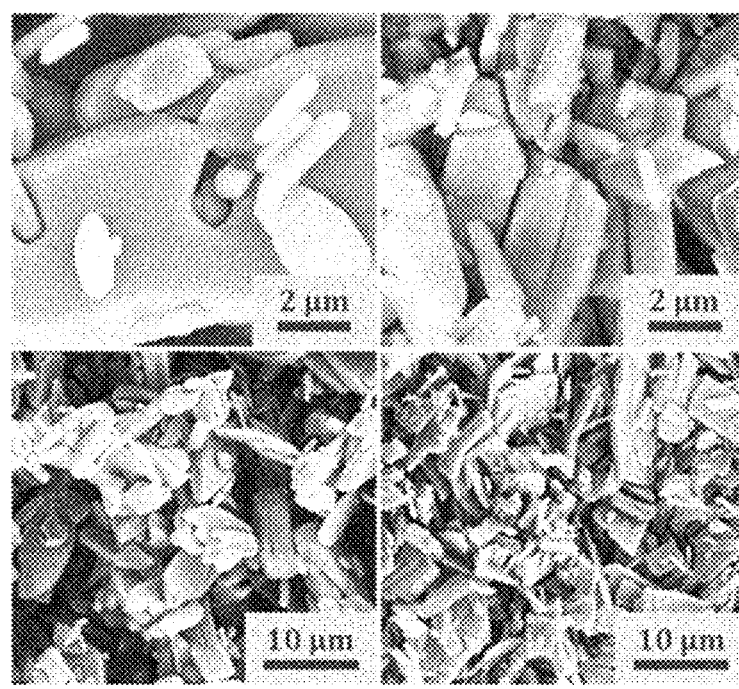
Figure 12:
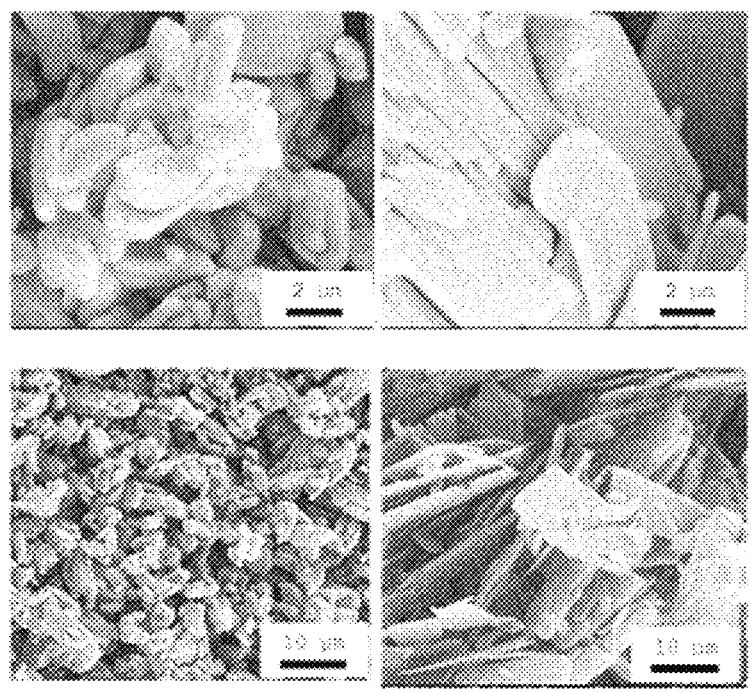
FIG. 12 shows scanning electron micrographs for various ratios of CS/Zn and Zn/P on changing the concentration of the phosphoric acid (Zn compound Zn acetate with citric acid as CS)
Figure 12:
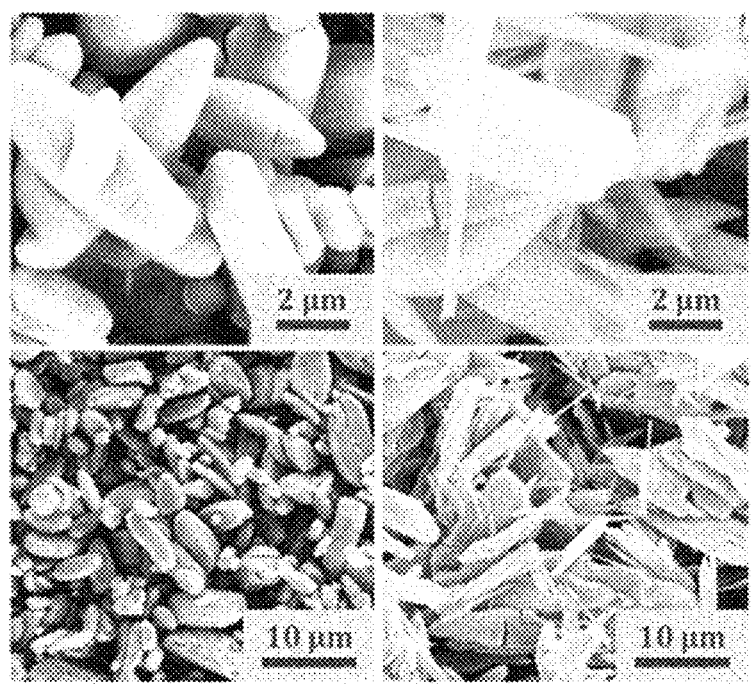
Figure 13:
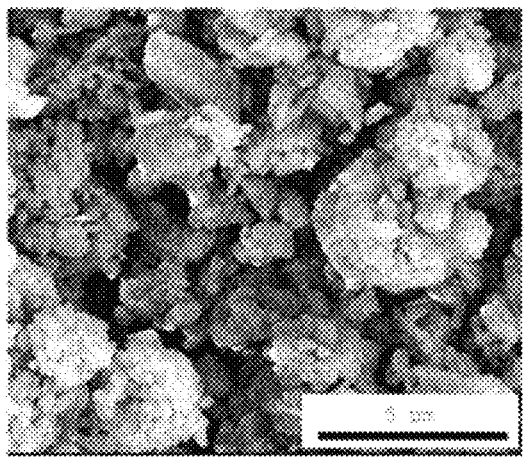
FIG. 13 shows scanning electron micrographs of obtained particles with CS/Zn 0/1 and CS/Zn 1/1 at Zn/P 1.5, $H_3PO_4$ (85 wt %) on dropwise addition of phosphate solution into the zinc acetate/CS solution (CS: citric acid)
Figure 13:
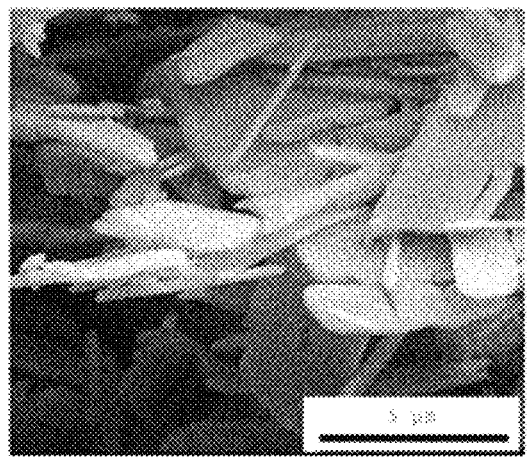
Figure 14:
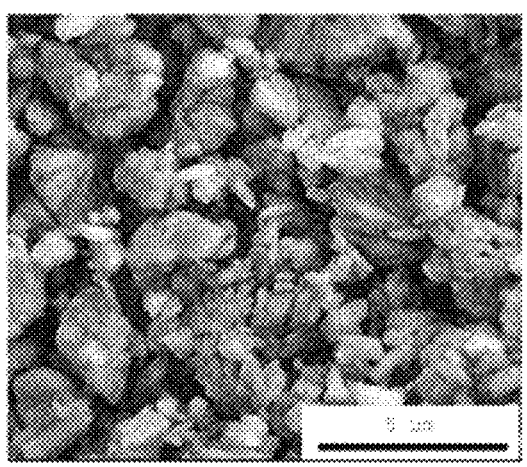
FIG. 14 shows scanning electron micrographs of obtained particles with CS/Zn 0/1 and CS/Zn 1/1 at Zn/P 1.5, $H_3PO_4$ (85 wt %) on single addition of phosphate solution into the zinc acetate/CS solution (citric acid); compared with FIG. 13, particle shape unaffected by addition mode.
Figure 14:
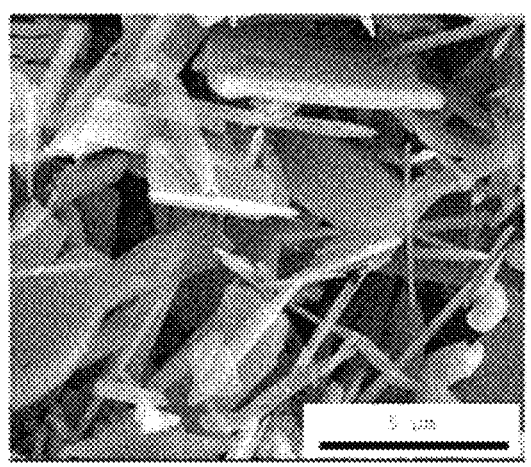

The influence of the chelate complexing agent is distinctly apparent in FIG. 10. The platelets only form in the presence of the chelate complexing agent.

FIGS. 11, 12, 13 and 14 likewise show the influence of the chelate complexing agent.

Figure 15:
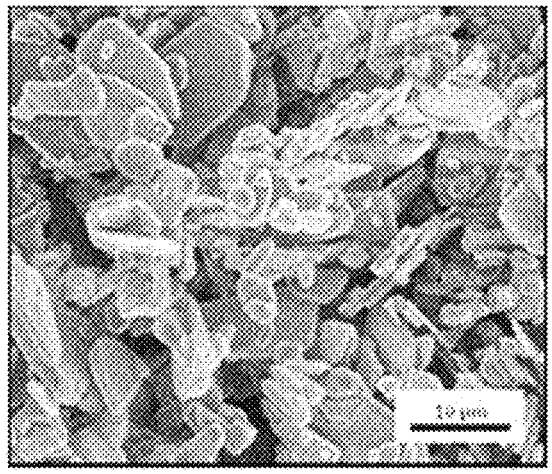
FIG. 15 shows scanning electron micrographs of obtained particles in Examples 4, 5 and 6 with Zn nitrate and $Na_2HPO_4$ as starting compounds; Zn/P 1, $Na_2HPO_4$ (10 wt %), centrifuged 4×, increasing CS/Zn ratio.
Figure 15:
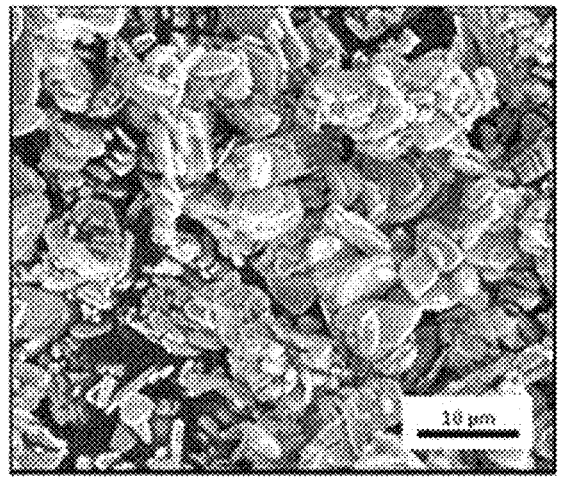
Figure 15:
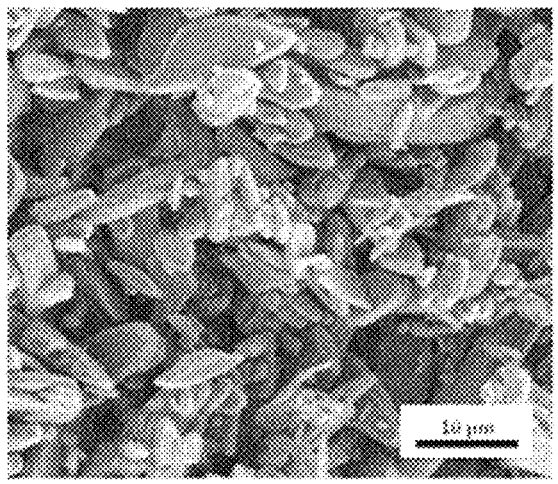
Figure 15:
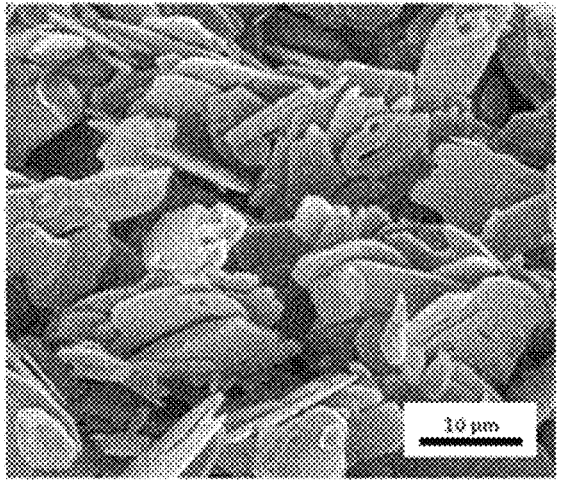
Figure 16:
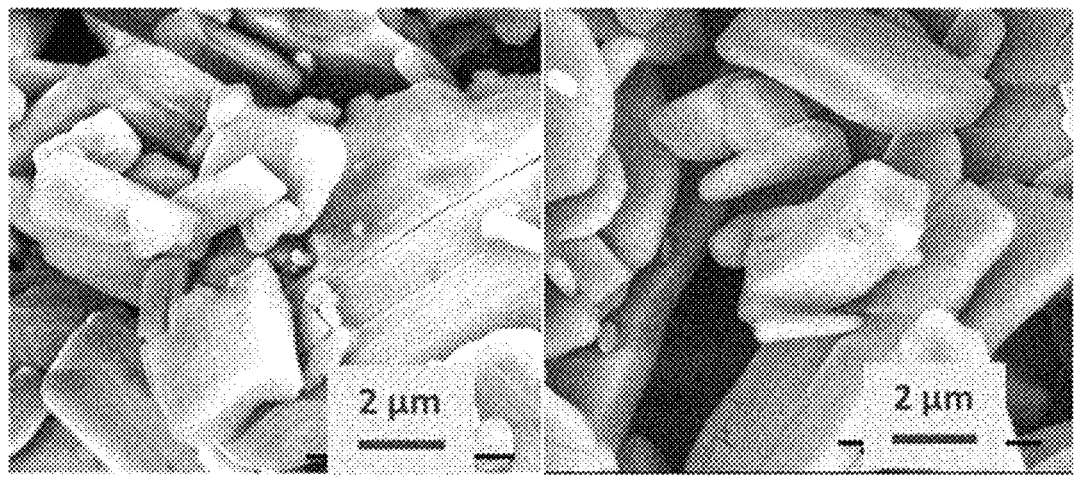
FIG. 16 shows scanning electron micrographs of Example 6: Zn/P 1, CS/Zn 0.8/1, $Na_2HPO_4$ (10 wt %), the particles were centrifuged differently often.
Figure 16:
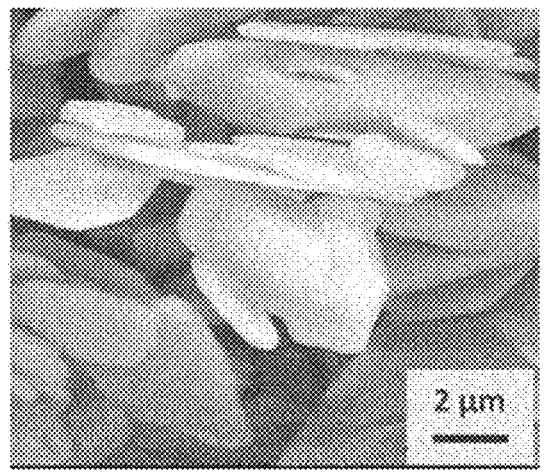

FIG. 15 shows how the aspect ratio of the particles may be controlled. As the proportion of chelate complexing agent increases, the aspect ratio increases.

Figure 17:
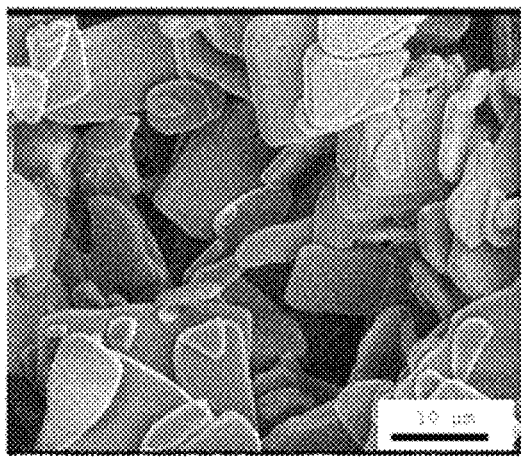
FIG. 17 shows scanning electron micrograph experiments to test the effect of various types of chelate complexing agents; Zn/P 1, CS/Zn 0.8/1, $Na_2HPO_4$ (10 wt %): morphology as a function of complexing agent type, malic acid corresponds to Example 17.
Figure 17:
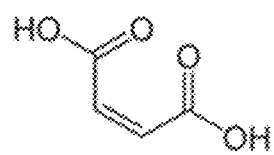
Figure 17:
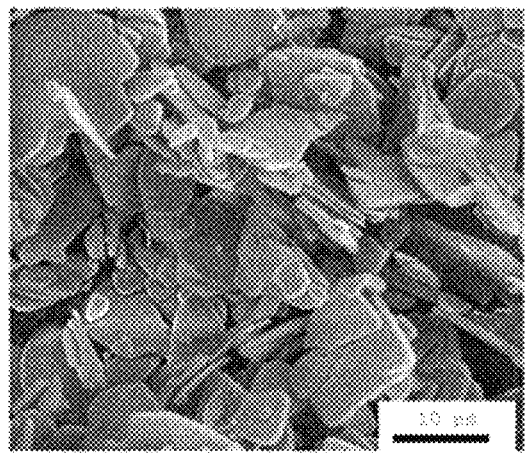
Figure 17:
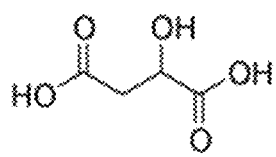
Figure 17:
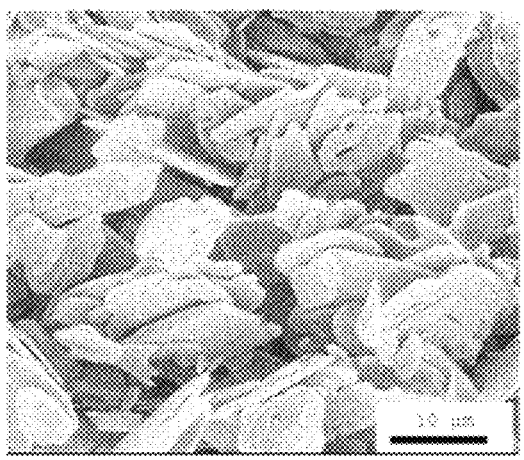
Figure 17:
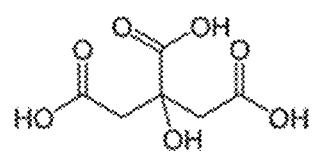
Figure 17:
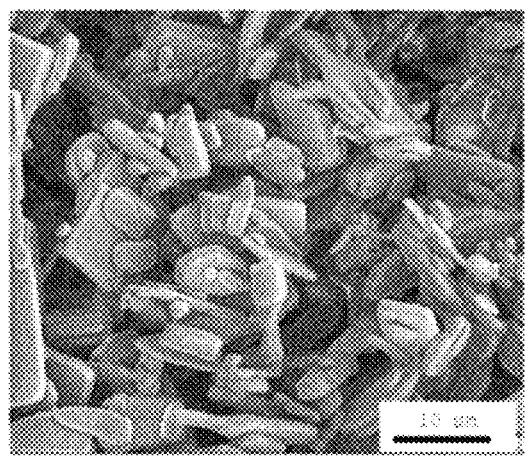
Figure 17:
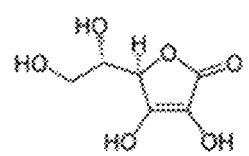
Figure 18:
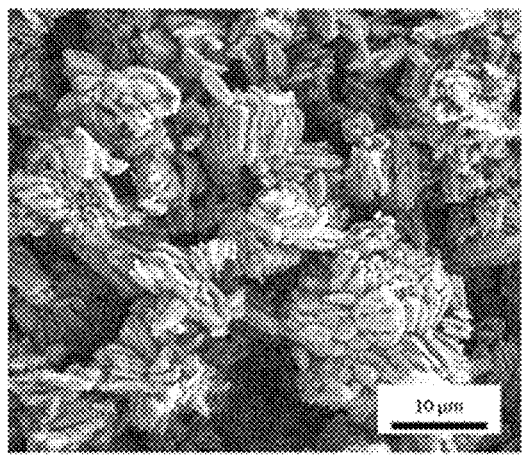
FIG. 18 shows scanning electron micrographs of Examples 7, 8 and 9; Zn/P 1, CS/Zn 0.5/1, $Na_2HPO_4$ (10 wt %), DEG/$H_2O$ 0.25 to 16.9 (in wt %), addition of phosphate solution into zinc nitrate/CS solution.
Figure 18:
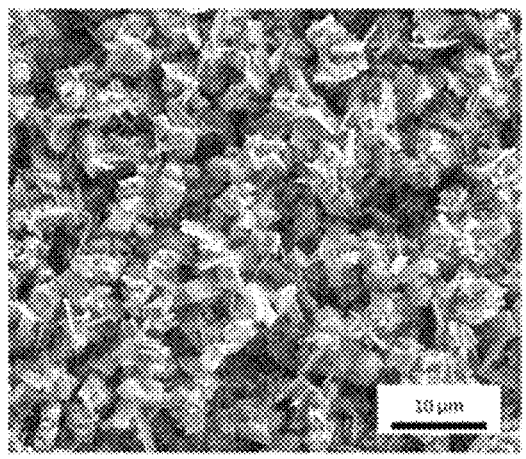
Figure 18:
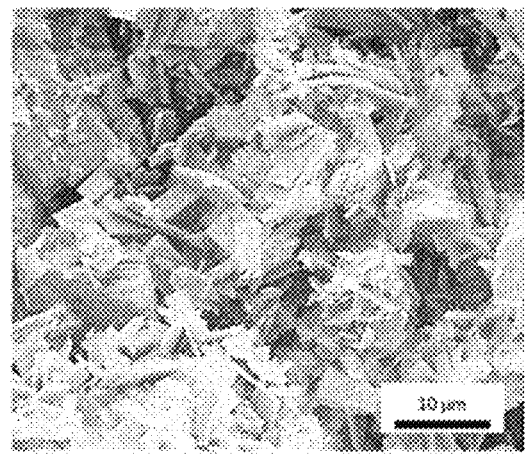

FIG. 17 shows that platelet-shaped particles are also obtainable with other chelate complexing agents.

Figure 19:
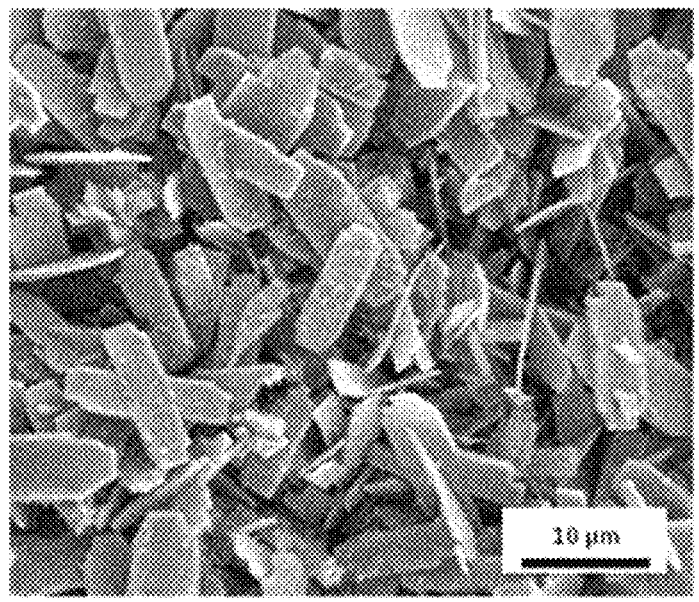
FIG. 19 shows scanning electron micrographs of compositions Zn/P 1.5 with CS/Zn 0.5/1, $Na_2HPO_4$ (1 wt %), in DEG/$H_2O$ 1/0, single addition of phosphate solution into zinc nitrate/CS solution.

It is also possible to obtain the particles from nonaqueous solutions, as is shown in FIG. 19.

Figure 20:
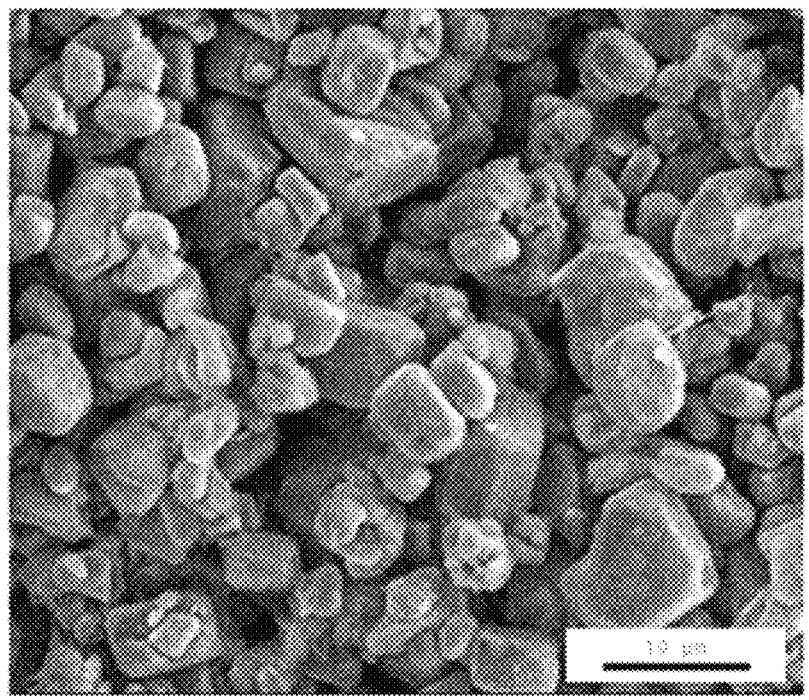
FIG. 20 shows manganese phosphate particles from manganese acetate tetrahydrate and 85% $H_3PO_4$ (Mn/P=1.5) without chelate complexing agent (CS), CS/Mn=0/1, (Example 18: comparative example without chelate complexing agent)
Figure 21:
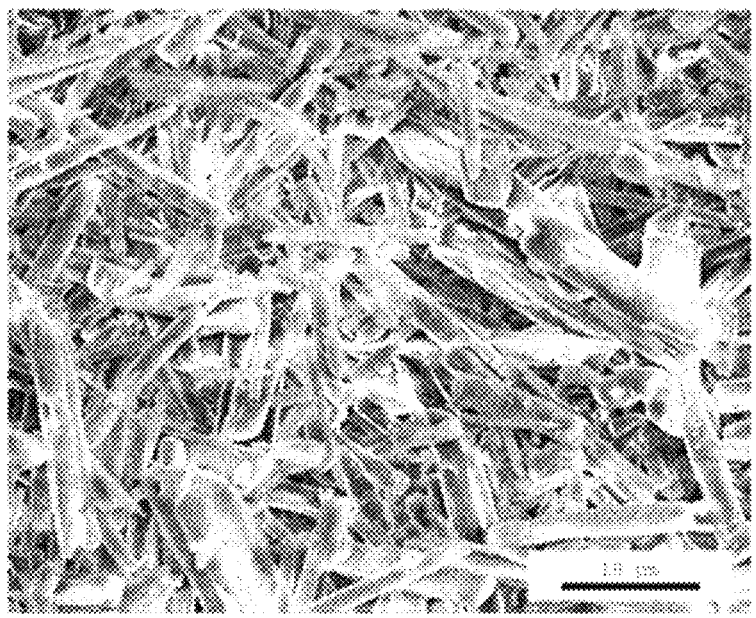
FIG. 21 shows manganese phosphate particles from manganese acetate tetrahydrate and 85% $H_3PO_4$ (Mn/P=1.5) with citric acid as chelate complexing agent (CS), CS/Mn=1/1, (Example 20)
Figure 22:
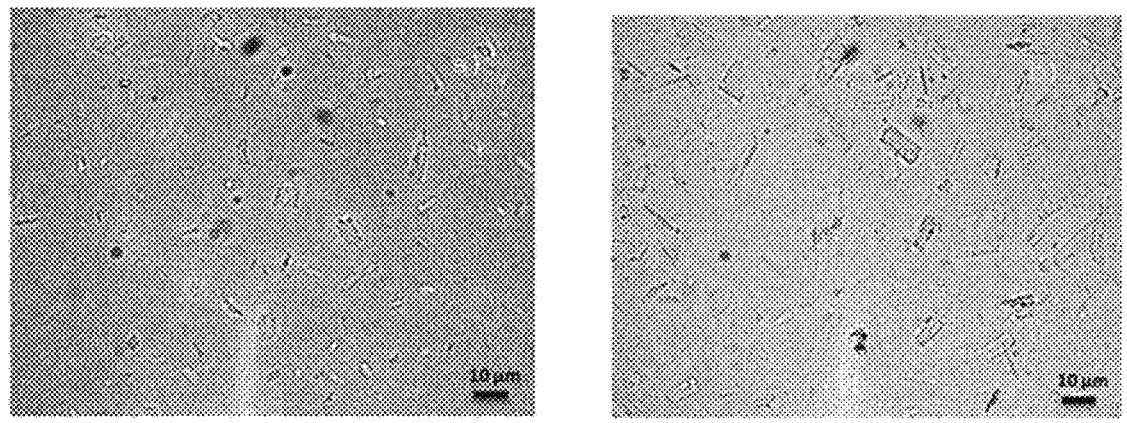
FIG. 22 shows optical micrographs of composites formed from epoxy resin matrix with 2 wt % of zinc phosphate particles from Example 2 (plan view) coated on glass, a) thermally curing epoxy resin-zinc phosphate composite (Example 21), b) UV-curing epoxy resin-zinc phosphate composite (Example 22)

Manganese (Examples 18 to 20) does not yield any platelet-shaped particles. Nor are any orthorhombic structures formed. The particles obtained are either round (FIG. 20) or acicular (FIG. 21).

XRD measurements were carried out using a D8-Advance (Bruker-AXS) powder diffractometer (40 kV; 30 mA; CuKα=1.54178 Å, divergence slit: 0.1°, detector: Lynxeye, detector slit 3 mm, measuring range: 2.8°-150° (2θ), step size: 0.02° (2θ), measuring time/step: 1 s).

Figure 23:
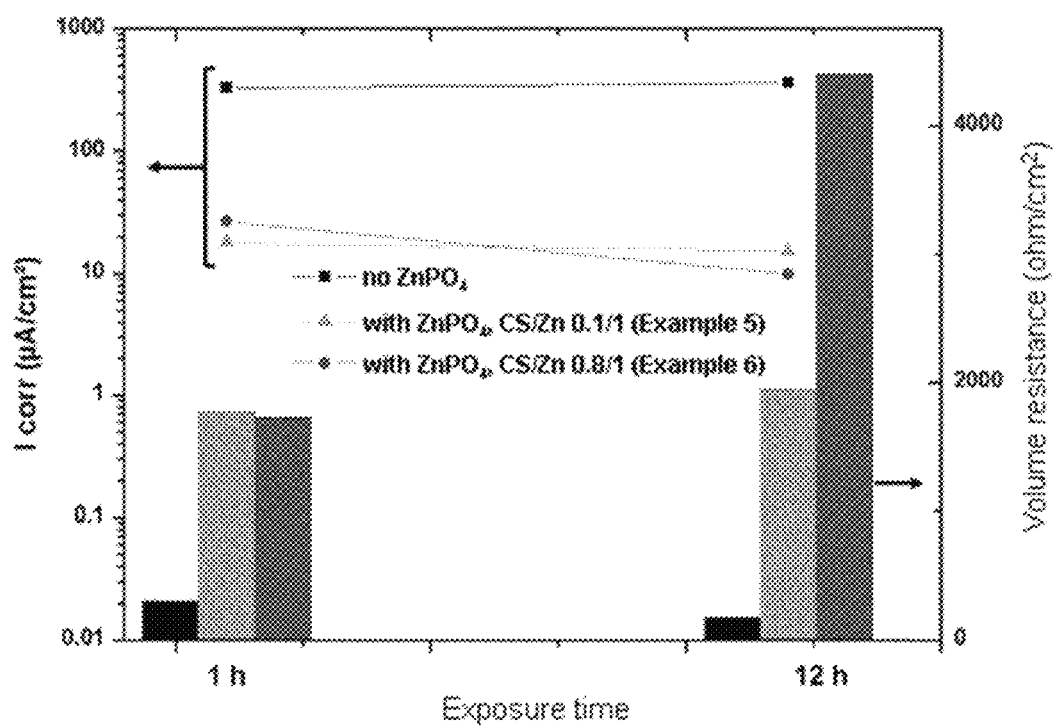
FIG. 23 shows effect of particles from Example 2 on the corrosion behavior of a standard steel surface, corrosion current $I_{corr}$ from potential measurements and volume resistance from electrochemical impedance measurements, steel: ST1203, medium: 3.5% of NaCl in water, T=23° C., 0.75 wt % of invention particles from Example 2 dispersed in medium; the columns mean: 1st column no $ZnPO_4$, 2nd column with $ZnPO_4$, CS/Zn 0.1/1 (Example 5); 3rd column with $ZnPO_4$ CS/Zn 0.8/1 (Example 6)

FIG. 23 shows the improvement in corrosion control due to the particles of the invention.

WORKING EXAMPLES

Example 1

Zinc Phosphate Particles from Zinc Acetate Dihydrate and 85% $H_3PO_4$ (Zn/P=1.5) with Citric Acid as Chelate Complexing Agent (CS) CS/Zn=0.166/1

3.29 g (15 mmol) of zinc acetate dihydrate were dissolved in 9.87 g of deionized water (25 wt %) and 0.480 g (2.5 mmol) of citric acid, dissolved in 1.44 g of deionized water (25 wt %), was added with stirring (about 500 rpm). The mixture was subsequently further stirred for 1 h. This was followed by 1.15 g of $H_3PO_4$ (85%) being continuously added dropwise at 23° C. with stirring (about 750 rpm) and the mixture obtained being further stirred at 600 rpm for 24 h. The zinc phosphate precipitate was centrifuged off, washed three times with deionized water, being recentrifuged (4000 rpm, 30 min at 18° C.) each time in between, and then vacuum dried at 30° C. for 24 h.

Example 1a

Zinc Phosphate Particles from Zinc Acetate Dihydrate and 85% $H_3PO_4$ (Zn/P=1.5) with Citric Acid as Chelate Complexing Agent (CS) CS/Zn=0.33/1

3.29 g (15 mmol) of zinc acetate dihydrate were dissolved in 9.87 g of deionized water (25 wt %) and 0.95 g (4.95 mmol) of citric acid, dissolved in 2.85 g of deionized water (25 wt %), was added with stirring (about 500 rpm). The mixture was subsequently further stirred for 1 h. This was followed by 1.15 g of $H_3PO_4$ (85%) being continuously added dropwise at 23° C. with stirring (about 750 rpm). It was only after 24 h that the zinc phosphate precipitate formed, which was then stirred at 600 rpm for a further 24 h. The zinc phosphate precipitate was centrifuged off, washed three times with deionized water, being recentrifuged (4000 rpm, 30 min at 18° C.) each time in between, and then vacuum dried at 30° C. for 24 h.

Example 1b

Zinc Phosphate Particles from Zinc Acetate Dihydrate and 85% $H_3PO_4$ (Zn/P=1.5) with Citric Acid as Chelate Complexing Agent (CS) CS/Zn=0.66/1

3.29 g (15 mmol) of zinc acetate dihydrate were dissolved in 9.87 g of deionized water (25 wt %) and 1.90 g (9.9 mmol) of citric acid, dissolved in 5.71 g of deionized water (25 wt %), was added with stirring (about 500 rpm). The mixture was subsequently further stirred for 1 h. This was followed by 1.15 g of $H_3PO_4$ (85%) being continuously added dropwise at room temperature with stirring (about 750 rpm). It was only after 24 h that the zinc phosphate precipitate formed, which was then stirred at 600 rpm for a further 24 h. The zinc phosphate precipitate was centrifuged off, washed three times with deionized water, being recentrifuged (4000 rpm, 30 min at 18° C.) each time in between, and then vacuum dried at 30° C. for 24 h.

Example 2

Zinc Phosphate Particles from Zinc Acetate Dihydrate and 85% $H_3PO_4$ (Zn/P=1.5) with Citric Acid as Chelate Complexing Agent (CS), CS/Zn=1/1

3.29 g (15 mmol) of zinc acetate dihydrate were dissolved in 9.87 g of deionized water (25 wt %) and 2.88 g (15 mmol) of citric acid, dissolved in 8.64 g of deionized water (25 wt %), was added with stirring (about 500 rpm). The mixture was subsequently further stirred for 1 h. This was followed by 1.15 g of $H_3PO_4$ (85%) being continuously added dropwise at 23° C. with stirring (about 750 rpm). It was only after 24 h that the zinc phosphate precipitate formed, which was then stirred at 600 rpm for a further 24 h. The zinc phosphate precipitate was centrifuged off, washed three times with deionized water, being recentrifuged (4000 rpm, 30 min at 18° C.) each time in between, and then vacuum dried at 30° C. for 24 h.

Example 2a

Zinc Phosphate Particles from Zinc Acetate Dihydrate and 30% $H_3PO_4$ (Zn/P=1.5) with Citric Acid as Chelate Complexing Agent (CS), CS/Zn=1/1

3.29 g (15 mmol) of zinc acetate dihydrate were dissolved in 9.87 g of deionized water (25 wt %) and 2.88 g (15 mmol) of citric acid, dissolved in 8.64 g of deionized water (25 wt %), was added with stirring (about 500 rpm). The mixture was subsequently further stirred for 1 h. This was followed by 3.27 g of $H_3PO_4$ (30%) being continuously added dropwise at 23° C. with stirring (about 750 rpm). It was only after 24 h that the zinc phosphate precipitate formed, which was then stirred at 600 rpm for a further 24 h. The zinc phosphate precipitate was centrifuged off, washed three times with deionized water, being recentrifuged (4000 rpm, 30 min at 18° C.) each time in between, and then vacuum dried at 30° C. for 24 h.

Example 3 (Comparative Example without Chelate Complexing Agent)

Zinc Phosphate Particles from Zinc Acetate Dihydrate and 85% $H_3PO_4$ (Zn/P=1.5) without Chelate Complexing Agent (CS), CS/Zn=0/1

3.29 g (15 mmol) of zinc acetate dihydrate were dissolved in 9.87 g of deionized water (25 wt %) and 1.15 g of $H_3PO_4$ (85%) were continuously added (23° C.) dropwise with stirring (about 750 rpm). The zinc phosphate precipitate formed and the mixture obtained was further stirred at 600 rpm for 24 h. The zinc phosphate precipitate was centrifuged off, washed three times with deionized water, being recentrifuged (4000 rpm, 30 min at 18° C.) each time in between, and then vacuum dried at 30° C. for 24 h.

Example 3a (Comparative Example without Chelate Complexing Agent)

Zinc Phosphate Particles from Zinc Acetate Dihydrate and 30% $H_3PO_4$ (Zn/P=1.5) without Chelate Complexing Agent (CS), CS/Zn=0/1

3.29 g (15 mmol) of zinc acetate dihydrate were dissolved in 9.87 g of deionized water (25 wt %) and 3.27 g of $H_3PO_4$ (30%) were continuously added (room temperature) dropwise with stirring (about 750 rpm). The zinc phosphate precipitate formed and the mixture obtained was further stirred at 600 rpm for 24 h. The zinc phosphate precipitate was centrifuged off, washed three times with deionized water, being recentrifuged (4000 rpm, 30 min at 18° C.) each time in between, and then vacuum dried at 30° C. for 24 h.

Example 4 (Comparative Example without Chelate Complexing Agent)

Zinc Phosphate Particles from Zinc Nitrate Hexahydrate and $Na_2HPO_4$ (Zn/P=1) without Chelate Complexing Agent (CS), CS/Zn=0/1

2.97 g of zinc nitrate hexahydrate (0.01 mol) were dissolved in 8.91 g of deionized water and stirred for 1 h. Concurrently 1.42 g of $Na_2HPO_4$ (0.01 mol) were dissolved in 12.8 g of deionized water and added dropwise into the zinc nitrate hexahydrate solution and further stirred for 24 h. The zinc phosphate precipitate was centrifuged off, washed three times with deionized water, being recentrifuged (4000 rpm, 30 min at 18° C.) each time in between, and then vacuum dried at 30° C. for 24 h.

Example 5

Zinc Phosphate Particles from Zinc Nitrate Hexahydrate and $Na_2HPO_4$ (Zn/P=1) with Citric Acid as Chelate Complexing Agent (CS), CS/Zn=0.1/1

2.97 g of zinc nitrate hexahydrate (0.01 mol) and 0.19 g of citric acid (0.001 mol) were dissolved in 9.48 g of deionized water and stirred for 1 h. Concurrently 1.42 g of $Na_2HPO_4$ (0.01 mol) were dissolved in 12.8 g of deionized water and added dropwise into the zinc nitrate hexahydrate solution. The zinc phosphate precipitate was centrifuged off, washed three times with deionized water, being recentrifuged (4000 rpm, 30 min at 18° C.) each time in between, and then vacuum dried at 30° C. for 24 h.

Example 6

Zinc Phosphate Particles from Zinc Nitrate Hexahydrate and $Na_2HPO_4$ (Zn/P=1) with Citric Acid as Chelate Complexing Agent (CS), CS/Zn=0.8/1

2.97 g of zinc nitrate hexahydrate (0.01 mol) and 1.5 g (0.008 mol) of citric acid were dissolved in 13.5 g of deionized water and stirred for 1 h. Concurrently 1.42 g of $Na_2HPO_4$ (0.01 mol) were dissolved in 12.8 g of deionized water and added dropwise into the zinc nitrate hexahydrate solution. The zinc phosphate precipitate was centrifuged off, washed three times with deionized water, being recentrifuged (4000 rpm, 30 min at 18° C.) each time in between, and then vacuum dried at 30° C. for 24 h.

Example 7

Zinc Phosphate Particles from Zinc Nitrate Hexahydrate and $Na_2HPO_4$ (Zn/P=1) in DEG/1120=3.5 with Citric Acid as Chelate Complexing Agent (CS), CS/Zn=0.5/1

2.97 g of zinc nitrate hexahydrate (0.01 mol) and 0.96 g (0.005 mol) of citric acid were dissolved in 10.6 ml of diethylene glycol and stirred for 1 h. Concurrently 1.42 g of $Na_2HPO_4$ (0.01 mol) were dissolved in a deionized water (12.8 g)/diethylene glycol (DEG, 33.5 g) mixture, stirred for 1 h and added all at once into the zinc nitrate hexahydrate solution. It is to this composition that the DEG/$H_2O$ weight ratio relates. The particle-containing mixture obtained was further stirred for 24 h. The zinc phosphate precipitate was centrifuged off, washed three times with deionized water, being recentrifuged (4000 rpm, 30 min at 18° C.) each time in between, and then vacuum dried at 30° C. for 24 h.

Example 8

Zinc Phosphate Particles from Zinc Nitrate Hexahydrate and $Na_2HPO_4$ (Zn/P=1) in DEG/1120=16.9 with Citric Acid as Chelate Complexing Agent (CS), CS/Zn=0.5/1

2.97 g of zinc nitrate hexahydrate (0.01 mol) and 0.96 g (0.005 mol) of citric acid were dissolved in 10.6 ml of diethylene glycol and stirred for 1 h. Concurrently 1.42 g of $Na_2HPO_4$ (0.01 mol) were dissolved in a deionized water (3.25 g)/diethylene glycol (43 g) mixture, stirred for 1 h and added all at once into the zinc nitrate hexahydrate solution and further stirred for 24 h. The zinc phosphate precipitate was centrifuged off, washed three times with deionized water, being recentrifuged (4000 rpm, 30 min at 18° C.) each time in between, and then vacuum dried at 30° C. for 24 h.

Example 9

Zinc Phosphate Particles from Zinc Nitrate Hexahydrate and $Na_2HPO_4$ (Zn/P=1) in DEG/$H_2O$=0.25 with Citric Acid as Chelate Complexing Agent (CS), CS/Zn=0.5/1

2.97 g of zinc nitrate hexahydrate (0.01 mol) and 0.96 g (0.005 mol) of citric acid were dissolved in 10.6 ml of diethylene glycol and stirred for 1 h. Concurrently 1.42 g of $Na_2HPO_4$ (0.01 mol) were dissolved in deionized water (46.23 g), stirred for 1 h and added all at once into the zinc nitrate hexahydrate solution and further stirred for 24 h. The zinc phosphate precipitate was centrifuged off, washed three times with deionized water, being recentrifuged (4000 rpm, 30 min at 18° C.) each time in between, and then vacuum dried at 30° C. for 24 h.

Example 10

Zinc Phosphate Particles from Zinc Nitrate Hexahydrate and $Na_2HPO_4$ (Zn/P=1.6) in DEG with citric acid as Chelate Complexing Agent (CS), CS/Zn=0.5/1

4.56 g of zinc nitrate hexahydrate (0.016 mol) and 1.6 g (0.008 mol) of citric acid were dissolved in 17.6 ml of diethylene glycol and stirred for 1 h. Concurrently 1.42 g of $Na_2HPO_4$ (0.01 mol) were stirred into diethylene glycol (125.8 ml) for 1 h and added all at once into the zinc nitrate hexahydrate solution and further stirred for 24 h. The zinc phosphate precipitate was centrifuged off, washed three times with deionized water, being recentrifuged (4000 rpm, 30 min at 18° C.) each time in between, and then vacuum dried at 30° C. for 24 h.

Example 11

Zinc phosphate particles from zinc acetate dihydrate and 85% $H_3PO_4$ (Zn/P=1.5) with Malic Acid as Chelate Complexing Agent (CS), CS/Zn=1/1

3.29 g (15 mmol) of zinc acetate dihydrate were dissolved in 9.87 g of deionized water (25 wt %) and 2.01 g (15 mmol) of malic acid, dissolved in 6.03 g of deionized water (25 wt %), was added with stirring (about 500 rpm). The mixture was subsequently further stirred for 1 h. This was followed by 1.15 g of $H_3PO_4$ (85%) being continuously added dropwise at 23° C. with stirring (about 750 rpm). It was only after about 2 min that the zinc phosphate precipitate formed, which was then stirred at 600 rpm for a further 24 h. The zinc phosphate precipitate was centrifuged off, washed three times with deionized water, being recentrifuged (4000 rpm, 30 min at 18° C.) each time in between, and then vacuum dried at 30° C. for 24 h.

Example 12

Zinc Phosphate Particles from Zinc Acetate Dihydrate and 85% $H_3PO_4$ (Zn/P=1.5) with Malic Acid as Chelate Complexing Agent (CS), CS/Zn=1.5/1

3.29 g (15 mmol) of zinc acetate dihydrate were dissolved in 9.87 g of deionized water (25 wt %) and 3.01 g (22.5 mmol) of malic acid, dissolved in 9.06 g of deionized water (25 wt %), was added with stirring (about 500 rpm). The mixture was subsequently further stirred for 1 h. This was followed by 1.15 g of $H_3PO_4$ (85%) being continuously added dropwise at 23° C. with stirring (about 750 rpm). It was only after 10 min that the zinc phosphate precipitate formed, which was then stirred at 600 rpm for a further 24 h. The zinc phosphate precipitate was centrifuged off, washed three times with deionized water, being recentrifuged (4000 rpm, 30 min at 18° C.) each time in between, and then vacuum dried at 30° C. for 24 h.

Example 13

(Zinc Manganese) Phosphate Particles from Zinc Acetate Dihydrate and Manganese Acetate Tetrahydrate, 85% $H_3PO_4$ (Zn,Mn)/P=1.5) without Chelate Complexing Agent (CS), (Zn/Mn=2/1), $(Zn_2Mn)_3(PO_4)_2$ 2.19 g (10 mmol) of zinc acetate dihydrate were dissolved in 6.57 g of deionized water (25 wt %) and 1.23 g (5 mmol) of manganese acetate tetrahydrate, dissolved in 3.69 g of deionized water (25 wt %), were added with stirring (about 300 rpm). Then, 1.15 g of $H_3PO_4$ (85%) were continuously added dropwise at 23° C. with stirring (about 1000 rpm). The zinc manganese phosphate precipitate formed and the mixture obtained was further stirred at 600 rpm for 24 h. The zinc manganese phosphate precipitate was centrifuged off, washed three times with deionized water, being recentrifuged (4000 rpm, 30 min at 18° C.) each time in between, and then vacuum dried at 30° C. for 24 h.

Example 14

(Zinc Manganese) Phosphate Particles from Zinc Acetate Dihydrate and Manganese Acetate Tetrahydrate, 85% $H_3PO_4$ (Zn,Mn)/P=1.5) without Chelate Complexing Agent (CS) (Zn/Mn=1/2), $(Zn_2Mn)_3(PO_4)_2$ 1.097 g (5 mmol) of zinc acetate dihydrate were dissolved in 3.30 g of deionized water (25 wt %) and 2.45 g (10 mmol) of manganese acetate tetrahydrate, dissolved in 7.35 g of deionized water (25 wt %), were added with stirring (about 300 rpm). 1.15 g of $H_3PO_4$ (85%) were continuously added dropwise at 23° C. into this mixture with stirring (about 1000 rpm). The zinc manganese phosphate precipitate formed and the mixture obtained was further stirred at 600 rpm for 24 h. The zinc manganese phosphate precipitate was centrifuged off, washed three times with deionized water, being recentrifuged (4000 rpm, 30 min at 18° C.) each time in between, and then vacuum dried at 30° C. for 24 h.

Example 15

(Zinc Manganese) Phosphate Particles from Zinc Acetate Dihydrate and Manganese Acetate Tetrahydrate, 85% $H_3PO_4$ (Zn,Mn)/P=1.5) with Citric Acid as Chelate Complexing Agent (CS) (Zn/Mn=2/1), CS/(Zn/Mn)=1/1, $(Zn_2Mn)_3(PO_4)_2$ 2.19 g (10 mmol) of zinc acetate dihydrate were dissolved in 6.57 g of deionized water (25 wt %) and 1.23 g (5 mmol) of manganese acetate tetrahydrate, dissolved in 3.69 g of deionized water (25 wt %), were added with stirring (about 300 rpm). This mixture of the two was admixed with 2.88 g (15 mmol) of citric acid monohydrate, dissolved in 8.64 g of water (25 wt %), with magnetic stirring (about 500 rpm). Stirring was subsequently continued for 1 h. This was followed by the continuous dropwise addition of 1.15 g of $H_3PO_4$ (85%) at 23° C. with stirring (about 750 rpm). It was only after about 20 h that the zinc manganese phosphate precipitate formed, which was then stirred at 600 rpm for a further 24 h. The zinc manganese phosphate precipitate was centrifuged off, washed three times with deionized water, being recentrifuged (4000 rpm, 30 min at 18° C.) each time in between, and then vacuum dried at 30° C. for 24 h.

Example 16

(Zinc Manganese) Phosphate Particles from Zinc Acetate Dihydrate and Manganese Acetate Tetrahydrate, 85% $H_3PO_4$ (Zn,Mn)/P=1.5) with Citric Acid as Chelate Complexing Agent (CS) (Zn/Mn=1/2), CS/(Zn/Mn)=1/1, $(Zn_2Mn)_3(PO_4)_2$ 1.097 g (5 mmol) of zinc acetate dihydrate were dissolved in 3.3 g of deionized water (25 wt %) and 2.45 g (10 mmol) of manganese acetate tetrahydrate, dissolved in 7.35 g of deionized water (25 wt %), were added with stirring (about 300 rpm). This mixture of the two was admixed with 2.88 g (15 mmol) of citric acid monohydrate, dissolved in 8.64 g of water (25 wt %), with magnetic stirring (about 500 rpm). Stirring was subsequently continued for 1 h. This was followed by the continuous dropwise addition of 1.15 g of $H_3PO_4$ (85%) at 23° C. with stirring (about 750 rpm). It was only after about 20 h that the zinc manganese phosphate precipitate formed, which was then stirred at 600 rpm for a further 24 h. The zinc manganese phosphate precipitate was centrifuged off, washed three times with deionized water, being recentrifuged (4000 rpm, 30 min at 18° C.) each time in between, and then vacuum dried at 30° C. for 24 h.

Example 17

Zinc Phosphate Particles from Zinc Nitrate Hexahydrate and $Na_2HPO_4$ (Zn/P=1) with Malic Acid as Chelate Complexing Agent (CS), CS/Zn=0.8/1

2.97 g of zinc nitrate hexahydrate (0.01 mol) and 1.07 g (0.008 mol) of malic acid were dissolved in 12.1 g of deionized water and stirred for 1 h. Concurrently 1.42 g of $Na_2HPO_4$ (0.01 mol) are dissolved in 12.8 g of deionized water and added dropwise into the zinc nitrate hexahydrate solution with stirring (about 750 rpm) and further stirred at 600 rpm for 24 h. The zinc phosphate precipitate was centrifuged off, washed three times with deionized water, being recentrifuged (4000 rpm, 30 min at 18° C.) each time in between, and then vacuum dried at 30° C. for 24 h.

Example 18: (Comparative Example without Chelate Complexing Agent)

Manganese Phosphate Particles from Manganese Acetate Tetrahydrate and 85% $H_3PO_4$ (Mn/P=1.5) without Chelate Complexing Agent (CS), CS/Mn=0/1

3.68 g (15 mmol) of manganese acetate tetrahydrate were dissolved in 9.87 g of deionized water (25 wt %) and 1.15 g of $H_3PO_4$ (85%) were continuously added dropwise (23° C.) with stirring (about 1000 rpm). The manganese phosphate precipitate formed. The mixture obtained was further stirred at 600 rpm for 24 h. The manganese phosphate precipitate was centrifuged off, washed three times with deionized water, being recentrifuged (4000 rpm, 30 min at 18° C.) each time in between, and then vacuum dried at 30° C. for 24 h.

Example 19

Manganese Phosphate Particles from Manganese Acetate Tetrahydrate and 85% $H_3PO_4$ (Mn/P=1.5) with Citric Acid as Chelate Complexing Agent (CS), CS/Mn=0.166/1

3.68 g (15 mmol) of manganese acetate dihydrate were dissolved in 9.87 g of deionized water (25% wt %) and 0.480 g (2.5 mmol) of citric acid monohydrate, dissolved in 1.44 g of deionized water (25 wt %), was added with stirring (about 500 rpm). Stirring was then continued for 1 h. After 1 h, 1.15 g of $H_3PO_4$ (85%) were continuously added dropwise at 23° C. with stirring (about 1000 rpm). The manganese phosphate precipitate formed. The mixture obtained was further stirred at 600 rpm for 24 h. The manganese phosphate precipitate was centrifuged off, washed three times with deionized water, being recentrifuged (4000 rpm, 30 min at 18° C.) each time in between, and then vacuum dried at 30° C. for 24 h.

Example 20

Manganese Phosphate Particles from Manganese Acetate Tetrahydrate and 85% $H_3PO_4$ (Mn/P=1.5) with Citric Acid as Chelate Complexing Agent (CS), CS/Mn=1/1

3.68 g (15 mmol) of manganese acetate tetrahydrate were dissolved in 11.04 g of deionized water (25% wt %) and 2.88 g (15 mmol) of citric acid monohydrate, dissolved in 8.64 g of deionized water (25 wt %), was added with stirring (about 500 rpm). Stirring was then continued for 30 min. After 1 h, 1.15 g of $H_3PO_4$ (85%) were continuously added dropwise at 23° C. with stirring (about 1000 rpm). It was only after about 8 h that the manganese phosphate precipitate formed, which was then stirred at 600 rpm for a further 24 h. The manganese phosphate precipitate was centrifuged off, washed three times with deionized water, being recentrifuged (4000 rpm, 30 min at 18° C.) each time in between, and then vacuum dried at 30° C. for 24 h.

Example 21

Producing a Composite Material from Zinc Phosphate Particles and a Thermally Curing Epoxy Resin 3.6 g of bisphenol A epoxy resin (Beckopox EP307, Cytec) were dissolved in 9.6 g of butyl acetate and admixed with 1.69 g of phenolic resin solution (Phenodur PR722/53BG/B, Cytec). Then, 0.1 g of zinc phosphate particles from Example 2 was added with stirring. The mixture obtained was further stirred for 2 h, dipcoated onto microscope slides made of glass and thermally cured at 200° C. for 30 min. A translucent coating formed.

Example 22

Producing a Composite Material from Zinc Phosphate Particles and a UV-Curing Epoxy Resin 2.47 g of cycloaliphatic epoxy resin (Araldit-CY-179, Huntsman) and 2.47 g of bisphenol A epoxy resin (Beckopox EP128, Cytec) were mixed with 1.30 g of trimethylolpropane oxetane as reactive diluent. Then, 0.1 g of zinc phosphate particles from Example 2 was added with stirring. The mixture obtained was further stirred for 2 h, admixed with 0.13 g of UV-6974 (Cyracure Photoinitiator, Dow), dipcoated onto microscope slides made of glass and then UV-cured (UV curing stand from Beltron, 2 lamps, ½ power, 2 m/min). A translucent coating formed.

TABLE 1

| Probe | C/% | H/% | N/% |
|---|---|---|---|
| 1x centrifuged | ≤0.3 | 2.13 | — |
| 2x centrifuged | ≤0.2 | 1.72 | — |
| 4x centrifuged | ≤0.3 | 1.70 | — |

TABLE 2

| Probe | C/% | H/% | N/% |
|---|---|---|---|
| 1x centrifuged | ≤0.8 | 1.81 | ≤0.4 |
| 2x centrifuged | ≤0.2 | 1.77 | ≤0.1 |
| 4x centrifuged | ≤0.2 | 1.73 | ≤0.1 |

TABLE 3

L: average length distribution of long longitudinal axis of platelets: D: average thickness distribution of platelets, AV = average aspect ratio from 20 determinations of aspect ratios of individual particles from scanning electron microscopy, $AV_{max}$ = maximum aspect ratio from individual particle determination.

| CS | L/µm | D/µm | AV | $AV_{max}$ |
|---|---|---|---|---|
| maleic acid | 11.81 ± 4.07 | 1.46 ± 0.50 | 8.39 ± 2.07 | 9.98 |
| malic acid | 11.36 ± 4.77 | 0.76 ± 0.24 | 16.32 ± 7.67 | 28.29 |
| citric acid | 14.18 ± 5.09 | 0.91 ± 0.32 | 17.80 ± 10.58 | 34.33 |
| ascorbic acid | 9.09 ± 4.17 | 1.36 ± 0.32 | 6.77 ± 2.73 | 9.97 |

REFERENCES CITED

Yuan et al. *Applied Mechanics and Materials*, 2012, 236-237, 105-108.

McCurdy et al. *Materials Research Bulletin* 2008, 43, 1836-1841.

Lubkowski et al. *Rev. Adv. Mater. Sci.* 2007, 14, 46-48,

DE2842150

DE3046697 A1

U.S. Pat. No. 4,153,479

EP 0896641 B1

DE 6970161 T2

U.S. Pat. No. 5,137,567

U.S. Pat. No. 5,030,285

DE1815112

What is claimed is:

1. A method for producing anisotropic zinc phosphate particles or zinc metal mixed phosphate particles comprising the steps of:
   a) producing a composition comprising:
      at least one phosphate compound;
      at least one zinc salt;
      at least one chelate complexing agent having at least two oxygen-containing groups; and
      at least one solvent,
   b) forming anisotropic zinc phosphate particles or zinc metal mixed phosphate particles at a temperature below 50° C.; and
   c) separating off the particles obtained, wherein the particles are platelet-shaped;
   wherein forming the particles has a reaction time of not less than 10 hours.

2. The method as claimed claim 1, wherein the Zn content of an aqueous composition is above 0.5 wt % based on $Zn^{2+}$.

3. The method as claimed in claim 1, wherein the platelet-shaped particles have an orthorhombic crystal structure.

4. The method as claimed in claim 1, wherein the composition has a pH below 3.5.

5. The method as claimed in claim 1, wherein the at least one phosphorus compound is phosphoric acid and/or an alkali metal salt of phosphoric acid.

6. The method as claimed in claim 1, wherein the at least one chelate complexing agent is an organic acid having a pKa value less than 6.

7. The method as claimed in claim 1, wherein the at least two oxygen-containing groups are carboxylic acid groups, carboxylic anhydride groups, ether groups, ester groups, keto groups or hydroxyl groups.

8. The method as claimed in claim 1, wherein the at least one chelate complexing agent is α-hydroxycarboxylic acids, citric acid, malic acid, tartaric acid, ascorbic acid, mandelic acid, glyoxalic acid, malonic acid, lactic acid, acetic acid, fumaric acid, maleic acid, gluconic acid, phthalic acid or adipic acid.

9. The method as claimed in claim 1, wherein the composition further comprises at least one further metal compound that is not a zinc compound.

10. The method as claimed in claim 9, wherein the at least one further metal compound comprises compounds of manganese, magnesium, calcium, strontium, iron, cerium, aluminum, nickel or cobalt.

11. The method as claimed in claim 1, wherein the molar ratio of the at least one chelate complexing agent and the at least one zinc salt and optionally the further metal compound is in the range from 0.1/1 to 2.0/1.

12. The method as claimed in claim 1, wherein the molar ratio of the at least one zinc salt based on Zn ions and an optionally present metal compound to the admixed amount of the at least one phosphate compound based on P (Zn/P) is in the range from 0.8 to 1.8.

13. The method as claimed in claim 1, wherein the platelet-shaped particles have a length-to-diameter aspect ratio of greater than two, and an extent in at least one dimension of at least 1 μm.

14. The method as claimed claim 1, wherein the platelet-shaped particles have a first dimension of at least 2 μm and a second dimension of at least 1 μm.

15. The method as claimed in claim 1, wherein the molar ratio of the at least one chelate complexing agent and the at least one zinc salt is at least 0.5/1.

16. The method as claimed in claim 9, wherein the at least one further metal compound comprises compounds of manganese, magnesium, calcium, strontium, cerium, aluminum, nickel or cobalt.

* * * * *